(12) United States Patent
Kawano et al.

(10) Patent No.: US 7,474,812 B2
(45) Date of Patent: Jan. 6, 2009

(54) MONITOR PHOTODETECTOR EQUIPPED OPTICAL MODULATOR

(75) Inventors: Kenji Kawano, Atsugi (JP); Masaya Nanami, Zama (JP); Makoto Saito, Atsugi (JP); Toru Nakahira, Atsugi (JP); Yuji Sato, Atsugi (JP); Seiji Uchida, Atsugi (JP)

(73) Assignee: Anritsu Corporation, Tokyo (JP)

( * ) Notice: Subject to any disclaimer, the term of this patent is extended or adjusted under 35 U.S.C. 154(b) by 299 days.

(21) Appl. No.: 10/566,735

(22) PCT Filed: Jun. 8, 2005

(86) PCT No.: PCT/JP2005/010509

§ 371 (c)(1),
(2), (4) Date: Feb. 1, 2006

(87) PCT Pub. No.: WO2005/124438

PCT Pub. Date: Dec. 29, 2005

(65) Prior Publication Data

US 2008/0044123 A1    Feb. 21, 2008

(30) Foreign Application Priority Data

Jun. 15, 2004 (JP) ............... 2004-177074
Dec. 27, 2004 (JP) ............... 2004-378266

(51) Int. Cl.
*G02F 1/035* (2006.01)
*G02B 6/10* (2006.01)

(52) U.S. Cl. .................. 385/3; 385/9; 385/28; 385/43; 385/45

(58) Field of Classification Search .................. None
See application file for complete search history.

(56) References Cited

U.S. PATENT DOCUMENTS 5,015,053 A * 5/1991 Johnson ............... 385/2

(Continued)

FOREIGN PATENT DOCUMENTS

EP    0 859 263 A2    8/1998

(Continued)

OTHER PUBLICATIONS

Norikazu Miyazaki et al, "LiNbO$_3$ Optical Intensity Modulator Packaged with Monitor Photodiode," IEEE Photonics Technology Letters, IEEE Service Center, Piscataway, NJ, vol. 13, No. 5, May 2001, pp. 442-444, XP001101327, ISSN: 1041-1135.

(Continued)

*Primary Examiner*—Tina M Wong
(74) *Attorney, Agent, or Firm*—Frishauf, Holtz, Goodman & Chick, P.C.

(57) ABSTRACT

An optical modulator has, on a substrate having electro-optic effect, an optical waveguide including an input optical waveguide, two branching optical waveguides which branch a light beam incident to the input optical waveguide into two beams, two interaction optical waveguides which modulate a light beam phase by applying a voltage between a center electrode and ground electrodes, a multiplexing optical waveguide which multiplexes the light beams which propagate through the two interaction optical waveguides, and an output optical waveguide which is connected to the multiplexing optical waveguide through a multiplexing point. In the optical modulator, a high-order mode light beam which is generated by multiplexing the phase-modulated light beam and which is radiated from the multiplexing point to an inside of the substrate as two radiant light beams while the high-order mode light beam hardly propagates through the output optical waveguide, and at least one of the two radiant light beams is detected by a monitor photodetector. The output optical waveguide is formed while deformed in order to secure a space for mounting the monitor photodetector such that at least one of optical axes of the radiant light beams in a substrate end portion located on the output optical waveguide and an end of the output optical waveguide are separated from each other by a predetermined distance.

11 Claims, 16 Drawing Sheets

U.S. PATENT DOCUMENTS

| | | |
|---|---|---|
| 5,953,466 A | 9/1999 | Kubota et al. |
| 6,587,604 B2 * | 7/2003 | Yamauchi ..................... 385/3 |
| 2003/0147591 A1 | 8/2003 | Doi et al. |
| 2003/0105848 A1 | 5/2005 | Yamada et al. |

FOREIGN PATENT DOCUMENTS

| | | |
|---|---|---|
| EP | 1 186 936 A1 | 3/2002 |
| JP | 3-145623 A | 6/1991 |
| JP | 06-186451 | 7/1994 |
| JP | 8-194195 A | 7/1996 |
| JP | 10-78568 A | 3/1998 |
| JP | 10-228006 A | 8/1998 |
| JP | 2000-101316 A | 4/2000 |
| JP | 2001-281507 A | 10/2001 |
| JP | 2003-233047 A | 8/2003 |

OTHER PUBLICATIONS

Notification of Transmittal of Copies of Translation of the International Preliminary Report on Patentability (IPRP), Chapter I or Chapter II of the Patent Cooperation Treaty for PCT/JP2005/010509, 5 sheets.

H.P. Nolting et al; Architecture of Crosstalk-Reduced Digital Optical 2×2 Switch (CRDOS) ; IEEE Photonics Technology Letters, Nov. 1995; pp. 1294-1296.

* cited by examiner

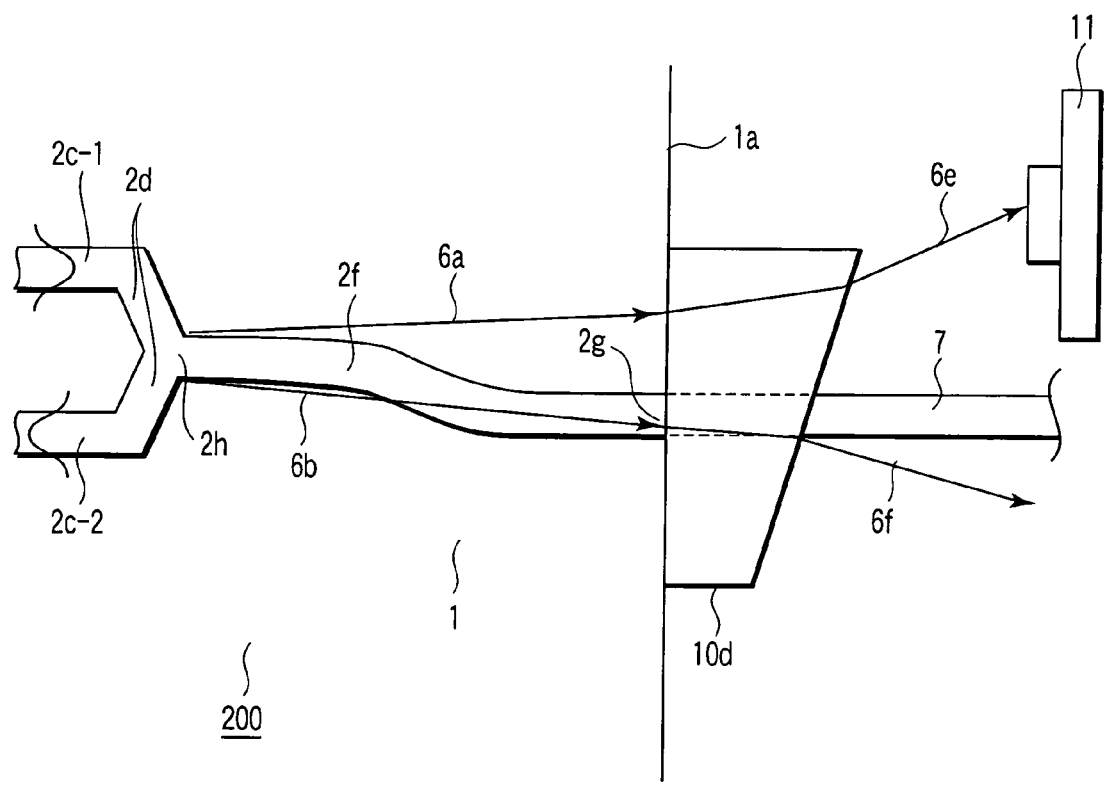
F I G. 22

MONITOR PHOTODETECTOR EQUIPPED OPTICAL MODULATOR

This application is a U.S. National Phase Application under 35 USC 371 of International Application PCT/JP2005/010509 filed Jun. 8, 2005.

TECHNICAL FIELD

The present invention relates to a monitor photodetector-equipped optical modulator, particularly to the optical modulator which is equipped with a small monitor photodetector having a stable operating state while facilitating mounting the monitor photodetector.

BACKGROUND ART

As is well known, in an optical modulator, a traveling-wave electrode type lithium niobate optical modulator (hereinafter abbreviated as LN optical modulator) in which an optical waveguide and a traveling-wave electrode are formed in a substrate made of a material such as lithium niobate ($LiNbO_3$) is applied to large-capacity transmission systems of 2.5 Gbit/s and 10 Gbit/s because of its excellent chirping characteristics. The lithium niobate has the so-called electro-optic effect in which the refractive index is changed by applying an electric field (hereinafter the lithium niobate substrate is abbreviated as LN substrate).

Recently a study of the application of the LN optical modulator to a very-large-capacity transmission system of 40 Gbit/s has been conducted, and the LN optical modulator is expected to be a key device in the large-capacity transmission system.

FIG. 12 is a perspective view showing a configuration of an LN optical modulator 100 according to a first prior art disclosed in Patent Reference 1.

Referring to FIG. 12, the reference numeral 1 designates a z-cut LN substrate, the reference numeral 2 designates a Mach-Zehnder type optical waveguide which is formed by thermal diffusion of Ti, the reference numeral 2a designates an input optical waveguide, the reference numeral 2b designates a Y-branching type of branching optical waveguide, the reference numerals 2c-1 and 2c-2 designate an interaction optical waveguide, the reference numeral 2d designates a Y-branching type of multiplexing optical waveguide, the reference numeral 2e designates an output optical waveguide, and the reference numeral 2g designates an edge portion of the output optical waveguide.

Further, in FIG. 12, the reference numeral 3 designates an electric signal source, the reference numeral 4 designates a center electrode of the traveling-wave electrode, the reference numerals 5a and 5b designate a ground electrode, the reference numerals 6a and 6b designate a radiant light beam which is generated when an optical signal is in an off state as described later, the reference numeral 7 designates a single-mode optical fiber for a signal light beam, the reference numeral 8 designates an optical fiber for receiving a radiant light beam, the reference numeral 11 designates a monitor photodetector which is formed by, e.g., a photodiode, the reference numeral 9 designates a radiant light beam detection means including a bias controller which adjusts an operating point of a bias power supply DC and an operating point of an LN optical modulator 100 based on a radiant light detection signal as described later from the monitor photodetector 11.

FIGS. 13A, 13B, and 13C are a view for explaining the operational principle of the LN optical modulator 100 which is configured as shown in FIG. 12.

FIGS. 13A and 13B are a view for explaining the operation of an optical waveguide 2, and FIG. 13C is a side view showing the LN optical modulator 100.

The operation of the LN optical modulator 100 will be described with reference to FIG. 12 and FIGS. 13A, 13B, and 13C.

First a light beam incident on the input optical waveguide 2a is divided into two beams in the branching optical waveguide 2b.

When the electric signal from the electric signal source 3 is not applied between the center electrode 4 of the traveling-wave electrode and the ground electrodes 5a and 5b, as shown in FIG. 13A, the light beams propagate through the interaction optical waveguides 2c-1 and 2c-2 with the in-phase each other.

Then, the light beams are multiplexed by the multiplexing optical waveguide 2d, and the light beam propagates through the output optical waveguide 2e as a basic mode. Finally the light beam is output to the single-mode optical fiber 7 for the signal light beam.

This is referred to as the on state. A point where the multiplexing optical waveguide 2d is coupled to the output optical waveguide 2f is referred to as multiplexing point 2h.

On the other hand, when the electric signal from the electric signal source 3 is applied between the center electrode 4 of the traveling-wave electrode and the ground electrodes 5a and 5b, as shown in FIG. 13B, the light beams propagate through the interaction optical waveguides 2c-1 and 2c-2 with the anti-phase each other.

Then, the light beams are multiplexed by the multiplexing optical waveguide 2d to form a high-order mode light beam of the first-order.

Usually the output optical waveguide 2e is designed to cut off the high-order mode light beam of the first-order.

Therefore, since the high-order mode light beam of the first-order cannot propagate through the output optical waveguide 2e, the high-order mode light beam of the first-order is radiated in the substrate 1 as radiant light beams 6a and 6b with a small angle of 0.7 degrees with respect to a horizontal direction as shown in FIG. 13B, the high-order mode light beam of the first-order is radiated in the substrate 1 with a small angle of 0.9 degrees with respect to a depth direction as shown in FIG. 13C, and the high-order mode light beam of the first-order propagates through the substrate 1 while broadened. This is referred to as the off state.

In a voltage-optical output characteristic shown in FIG. 14, a curve indicated by a solid line shows a certain state of the voltage-optical output characteristic of the LN optical modulator 100, and Vb designates a DC bias voltage at that state.

As shown in FIG. 14, usually the DC bias voltage Vb is set at a midpoint between a peak and a bottom of the optical output characteristic curve.

On the other hand, as shown in FIG. 14 by a broken line, when the voltage-optical output characteristic is changed for some reason such as temperature change, it is necessary that the setting of the bias point is changed to Vb'.

In this first prior art, the radiant light beam is received by the optical fiber 8 for receiving the radiant light beam and the radiant light beam propagates through the optical fiber 8 for receiving the radiant light beam, and then the radiant light beam is converted into current by causing the radiant light beam to be incident or the monitor photodetector 11 made of a photodiode, for example.

The radiant light detection means 9 including the bias controller detects the change in voltage-optical output characteristic by magnitude of the current, and the radiant light detection means 9 finds the optimum bias point of the DC bias voltage by the bias power supply DC.

Patent Reference 1: Jpn. Pat. Appln. KOKAI Publication No. 3-145623

However, in the LN optical modulator 100 having the above configuration, there are the following problems.

Actually, as shown in FIGS. 13B and 13C, since the radiant light beams are output downward into the substrate 1 with the small angle of 0.7 degrees with respect to the horizontal direction of the substrate 1 and the small angle of 0.9 degrees with respect to the depth direction, it is necessary that the optical fiber 8 for receiving the radiant light beam is arranged very close to the single-mode optical fiber 7 for the signal light beam and at a position which is slightly lower than the single-mode optical fiber 7 for the signal light beam.

FIG. 15 shows an optical-signal off state when viewed from the single-mode optical fiber 7 for the signal light beam side.

In FIG. 13B, for example, assuming that a length in an optical axis direction of the output optical waveguide 2e is 4 mm, since the propagation angle is only 0.7 degrees in the horizontal direction of the radiant light beam as described above, a space between the single-mode optical fiber 7 for the signal light beam and the radiant light beam 6a or the radiant light beam 6b is as extremely narrow as about 50 μm. Therefore, it is very difficult that the single-mode optical fiber 7 for the signal light beam and the optical fiber 8 for receiving the radiant light beam are mounted together.

It will be described with reference to FIGS. 16A and 16B (for example, see FIG. 9 in Patent Reference 1).

Referring to FIGS. 16A and 16B, the reference numeral 7a designates a core of the single-mode optical fiber for the signal light beam, the reference numeral 8a designates a core of the radiant light reception optical fiber, and the reference numeral 10a designates a capillary (the capillary is made of a dielectric material, usually a glass material is used, however, other material such as a ceramic material may be used).

A hole which is different from a hole for the single-mode optical fiber 7 for the signal light beam is made in the capillary 10, and the optical fiber 8 for receiving the radiant light beam is fixed into the hole.

Thus, each positional relationship is adjusted and fixed such that the signal light beam is coupled to the core 7a of the single-mode optical fiber 7 for the signal light beam and such that the radiant light beam 6b (or 6a) is coupled to the core 8a of the optical fiber 8 for receiving the radiant light beam.

As described above, in the LN optical modulator 100 according to the first prior art, in spite of the distance between the signal light beam and the radiant light beam is as extremely small as about 50 μm, the mounting, in which the signal light beam is coupled to the core 7a of the single-mode optical fiber 7 for the signal light beam and the radiant light beam is coupled to the core 8a of the optical fiber 8 for receiving the radiant light beam, is required. Therefore, since the mounting is very difficult to perform, the development of the LN optical modulator having the structure in which the mounting is easy to perform is demanded.

Usually, in order to avoid the difficulty of the mounting, it is thought that the distance between the signal light beam and the radiant light beam is broadened.

Aside from the idea that the distance between the signal light beam and the radiant light is broadened, there is disclosed a technology in which an interference pattern is formed far away from the signal light beam by causing the radiant light beam to interfere with the signal light beam (for example, see Patent Reference 2).

However, in the technology, the interference between the radiant light beam and the signal light beam means that the signal light beam is attenuated. As a result, there is the problem that the interference leads to an increase in loss of the signal light beam or the interference pattern can be formed only in a range on which the signal light beam has an influence, i.e., in an area relatively close to the signal light beam because of the mere interference. Therefore, actually the technology disclosed in Patent reference 2 cannot solve the problem of the mounting difficulty.

Patent Reference 2: Jpn. Pat. Appln. KOKAI Publication No. 10-228006

Thus, it is very difficult that both the single-mode optical fiber 7 for the signal light beam and the optical fiber 8 for receiving the radiant light beam are mounted in the capillary 10a.

Therefore, instead of the use of the optical fiber 8 for receiving the radiant light beam, it is thought that the radiant light beam is received by the monitor photodetector 11 such as the monitor photodiode after the radiant light beam passes through the capillary 10a.

In this case, assuming that refractive indexes of the z-cut LN substrate 1 and the capillary 10a are set at 2.14 and 1.45 respectively, because the radiant light beam propagates through the capillary 10a with an angle of refraction of ±0.7°×2.14/1.45=±1.0°, the radiant light beam propagates extremely close to the single-mode optical fiber 7 for the signal light beam fixed in the capillary 10a. Therefore, actually it is difficult to mount the monitor photodetector 11 such as the monitor photodiode.

FIG. 17 shows the LN optical modulator 100 according to a second prior art which is of the structure for solving these problems.

In the LN optical modulator 100 according to the second prior art, the radiant light beams 6a and 6b propagating through the z-cut LN substrate 1 are caused to propagate as radiant light beams 6c and 6d through a capillary 10b whose rear end is inclined.

At this point, total reflection of the light beam is performed to output the light beam to the outside by previously depositing a dielectric multi-layer film 14 on the rear-end inclined surface of the capillary 10b, and the light beam is received by the monitor photodetector 11 such as the monitor photodiode to convert the light beam into the current.

However, in the LN optical modulator 100 according to the second prior art, there are the following serious problems. Then, the problems will be discussed.

First an optical path length, in which the radiant light beams 6a and 6b reach to the monitor photodetector 11 such as the monitor photodiode after passing through the substrate facet 1a, will be considered.

In the case of the radiant light beam 6c, the radiant light beam 6c propagates through the capillary 10b by a distance of $L_1$ after passing through the substrate facet 1a. Then, the radiant light beam 6c is reflected at the dielectric multi-layer film 14 on the rear-end inclined surface of the capillary 10b, and the radiant light beam 6c propagates upward through the capillary 10b by a distance of $L_2$.

Then, the radiant light beam 6c propagates through air by a distance of $L_3$, and the radiant light beam 6c reaches the monitor photodetector 11 such as the monitor photodiode.

Assuming that the refractive index of the capillary 10d is $n_c$, a total optical path length $L_{6c}$ through which the radiant light beam 6c propagates becomes $L_{6c}=n_cL_1+n_cL_2+L_3$.

On the other hand, in the case of the radiant light beam 6d, the radiant light beam 6d propagates through the capillary 10b by a distance of $L_4$ after passing through the substrate facet 1a. Then, the radiant light beam 6d is reflected at the dielectric multi-layer film 14 on the rear-end inclined surface of the capillary 10b, and the radiant light beam 6d propagates upward through the capillary 10b by a distance of $L_5$.

Then, the radiant light beam 6d propagates through air by a distance of $L_6$, and the radiant light beam 6d reaches the monitor photodetector 11 such as the monitor photodiode.

A total optical path length $L_{6d}$ through which the radiant light beam 6d propagates becomes $L_{6d}=n_c L_4 + n_c L_5 + L_6$.

On the other hand, the radiant light beams 6a and 6b propagate through the capillary 10b with different angles of ±1.0°, and the radiant light beams 6a and 6b are reflected upward at the dielectric multi-layer film 14 on the rear-end inclined surface of the capillary 10b. Then, as shown in FIG. 18, the radiant light beams 6c and 6d overlap each other to generate the interference when the radiant light beams 6c and 6d are incident on the monitor photodetector 11 such as the monitor photodiode.

FIG. 19 shows a state in which phases of the radiant light beams 6c and 6d differ from each other by about 180 degrees.

Thus, when the phases of the radiant light beams 6c and 6d differ from each other by 180 degrees, as shown in FIG. 20A, there is a point where power of the radiant light beams 6c and 6d become zero in the overlapped portion.

However, because the refractive index $n_c$ of the capillary 10b varies depending on temperature, the optical path lengths $L_{6c}$ and $L_{6d}$ vary depending on the temperature when the radiant light beams 6c and 6d are incident on the monitor photodetector 11 such as the monitor photodiode.

As a result, since a phase difference between the radiant light beams 6c and 6d is different from 180 degrees, the power of the overlapped portion between the radiant light beams 6c and 6d never becomes zero at any point as shown in FIG. 20B.

In other words, as shown in FIG. 18 to FIG. 20B, the light intensity of the overlapped portion between the radiant light beams 6c and 6d varies depending on the temperature, so that a trouble occurs in the DC bias control of the LN optical modulator 100.

Further, as with the capillary 10a in the first prior art shown in FIG. 16, in the second prior art, it is also necessary that the single-mode optical fiber 7 for the signal light beam is mounted in the capillary 10b.

In both the capillaries 10a and 10b, in order to facilitate the mounting of the single-mode optical fiber 7 for the signal light beam, it is desirable that a guide spot facing larger than an outer shape of the single-mode optical fiber 7 for the signal light beam is made in the rear ends of the capillaries 10a and 10b.

However, since the radiant light beam propagates near the single-mode optical fiber 7 for the signal light beam in both the capillaries 10a and 10b, the guide spot facing cannot be provided in the rear ends of the capillaries 10a and 10b.

FIG. 21 shows the LN optical modulator 100 according to a third prior art which is of the structure for solving these problems.

In the LN optical modulator 100 according to the third prior art, because only the radiant light beam 6c is received by the monitor photodetector 11 such as the monitor photodiode, as shown in FIG. 21, it is devised that a capillary 10c is formed in the shape in which a half of the capillary 10c is cut off such that the radiant light beam 6d is not incident on the monitor photodetector 11 such as the monitor photodiode.

The half cut-off shape of the capillary 10c enables the guidance of the mounting of the single-mode optical fiber 7 for the signal light beam.

However, in the structure of the LN optical modulator 100 according to the third prior art, it is necessary that the capillary 10c is machined in the complicated structure. Further, as with the capillary 10b of the LN optical modulator 100 according to the second prior art shown in FIG. 17, it is necessary that a dielectric multi-layer film 15 for performing the total reflection of the light is deposited on the rear-end inclined surface of the capillary 10c. Therefore, there is the problem that production cost of the optical modulator is further increased as a whole.

In the structure of the LN optical modulator 100 according to the third prior art, since the light which can be received by the monitor photodetector 11 such as the monitor photodiode is only the radiant light beam 6c, there is also the problem the power becomes a half.

Patent Reference 3: Japanese Patent Application No. 2000-101316

DISCLOSURE OF INVENTION

Therefore, an object of the present invention is to solve the problems caused by the prior art and to provide an optical modulator which is equipped with a small monitor photodetector having a stable operating state while facilitating mounting the monitor photodetector.

In order to achieve the above object, a first aspect of the present invention provides a monitor photodetector-equipped optical modulator comprising an optical modulator having a substrate (1), an optical waveguide (2), a center electrode (4), and at least one ground electrode (5a and 5b), the substrate having electro-optic effect, the optical waveguide which guides a light beam being formed on one surface side of the substrate, the center electrode and the at least one ground electrode being applied therebetween voltage for modulating the light beam guided by the optical waveguide, the optical waveguide including an input optical waveguide (2a), two branching optical waveguides (2b and 2b), two interaction optical waveguides (2c-1 and 2c-2), a multiplexing optical waveguide (2d), and an output optical waveguide (2f), the light beam being incident on the optical waveguide through the input optical waveguide, the two branching optical waveguides guiding the light beam incident on the input optical waveguide while branching the light beam into two light beams, the two interaction optical waveguides modulating each phase of the two light beams by applying the voltage between the center electrode and the at least one ground electrode, the multiplexing optical waveguide multiplexing the two light beams which propagate through the two interaction optical waveguides, the output optical waveguide being connected to the multiplexing optical waveguide through a multiplexing point (2h) of the multiplexing optical waveguide which multiplexes the two light beams, a high-order mode light beam which is generated by multiplexing phase-modulated two light beams in the multiplexing optical waveguide being radiated from the multiplexing point to an inside of the substrate as two radiant light beams (6a and 6b) while the high-order mode light beam hardly propagates through the output optical waveguide in the optical modulator; and a monitor photodetector (11) which detects at least one of the two radiant light beams (6a and 6b) radiated from the multiplexing point to the inside of the substrate of the optical modulator, the optical modulator characterized in that the output optical waveguide is formed while deformed in order to secure a space for mounting the monitor photodetector such that at least one of optical axes of the two radiant light beams in a substrate facet (1a) located on the output optical waveguide of the substrate and an edge portion (2g) of the output optical waveguide are separated from each other by a predetermined distance.

In order to achieve the above object, a second aspect of the present invention provides a monitor photodetector-equipped optical modulator according to the first aspect, characterized in that the output optical waveguide is formed while a position of the multiplexing point (2h) in a direction orthogonal to a longitudinal direction of the substrate differs from a position of the edge portion (2g) of the output optical waveguide.

In order to achieve the above object, a third aspect of the present invention provides a monitor photodetector-equipped optical modulator according to the first aspect, characterized in that the output optical waveguide is a Mach-Zehnder type optical waveguide.

In order to achieve the above object, a fourth aspect of the present invention provides a monitor photodetector-equipped optical modulator according to the first aspect, characterized in that the monitor photodetector is provided near the substrate facet.

In order to achieve the above object, a fifth aspect of the present invention provides a monitor photodetector-equipped optical modulator according to the fourth aspect, characterized in that the monitor photodetector is provided through room.

In order to achieve the above object, a sixth aspect of the present invention provides a monitor photodetector-equipped optical modulator according to the first aspect, characterized by further comprising a mirror (12) which is fixed near the substrate facet, wherein, after at least one of the two radiant light beams is emitted from the substrate, an optical path is changed by the mirror and the radiant light beam is adapted to be incident on the monitor photodetector.

In order to achieve the above object, a seventh aspect of the present invention provides a monitor photodetector-equipped optical modulator according to the first aspect, characterized by further comprising a capillary (10d) which is fixed near the substrate facet, wherein, after at least one of the two radiant light beams is emitted through the capillary, the radiant light beam is adapted to be incident on the monitor photodetector.

In order to achieve the above object, an eighth aspect of the present invention provides a monitor photodetector-equipped optical modulator according to the first aspect, characterized by further comprising an optical power attenuation mechanism (16) which is provided between the multiplexing point (2h) and the substrate facet (1a) on the output optical waveguide side of the substrate such that one of the two radiant light beams (6a and 6b) radiated from the multiplexing point (2h) of the multiplexing optical waveguide (2d) is attenuated while the radiant light beam propagates toward the substrate facet (1a).

In order to achieve the above object, a ninth aspect of the present invention provides a monitor photodetector-equipped optical modulator according to the first aspect, characterized in that the monitor photodetector is formed by a photodiode.

In order to achieve the above object, a tenth aspect of the present invention provides a monitor photodetector-equipped optical modulator according to the seventh aspect, characterized in that a facet to the substrate facet side of the capillary is substantially parallel to a facet to a side in which one of the two radiant light beams is emitted, of the capillary.

In order to achieve the above object, an eleventh aspect of the present invention provides a monitor photodetector-equipped optical modulator according to the seventh aspect, characterized in that a region, where the facets are not parallel to each other, exists between the facet to the substrate facet side of the capillary and at least a part of the facet to the side in which one of the two radiant light beams is emitted, of the capillary.

According to the monitor photodetector-equipped optical modulator of the present invention, in order to easily secure a space for mounting the monitor photodetector such as the photodiode, the optical axis of the output optical waveguide through which the output of the signal light beam propagates is deformed such that the output optical waveguide is bend, and the optical axis of the output optical waveguide is shifted from the multiplexing point of the Y-branching type of multiplexing optical waveguide toward the direction parallel to the surface of the LN substrate in the substrate surface direction, which allows the distance between the signal light beam and the radiant light beam to be increased at the substrate facet.

Therefore, in the monitor photodetector-equipped optical modulator of the present invention, the reception of the radiant light beam can be facilitated while the signal light beam is efficiently coupled to the single-mode optical fiber for the signal light beam.

Further, in the monitor photodetector-equipped optical modulator of the present invention, because the utilization of the light reflection is not basically required, a change in light intensity caused by the interference between the reflected light beams is not generated. Therefore, light-reception current can stably be obtained.

Further, in the monitor photodetector-equipped optical modulator of the present invention, both the two radiant light beams can also be converted into the light-reception current. In this case, the large light-reception current can be obtained.

Further, in the monitor photodetector-equipped optical modulator of the present invention, the distance between the signal light beam and the radiant light beam can be increased only by shifting the output optical waveguide through which the signal light propagates. Therefore, the larger distance between the signal light beam and the radiant light beam can be achieved when compared with the case of the utilization of the interference between the signal light beam and the radiant light beam, and there is an advantage that signal light loss is hardly increased because the interference between the signal light beam and the radiant light beam is not utilized.

BRIEF DESCRIPTION OF DRAWINGS

FIG. 22 is a top view showing a configuration of a main portion of an LN optical modulator which is applied as a seventh embodiment of the monitor photodetector-equipped optical modulator according to the present invention.

BEST MODE FOR CARRYING OUT THE INVENTION

Embodiments of a monitor photodetector-equipped optical modulator according to the present invention will be described below with reference to FIG. 1 to FIG. 11 and FIG. 22.

Figure 10:
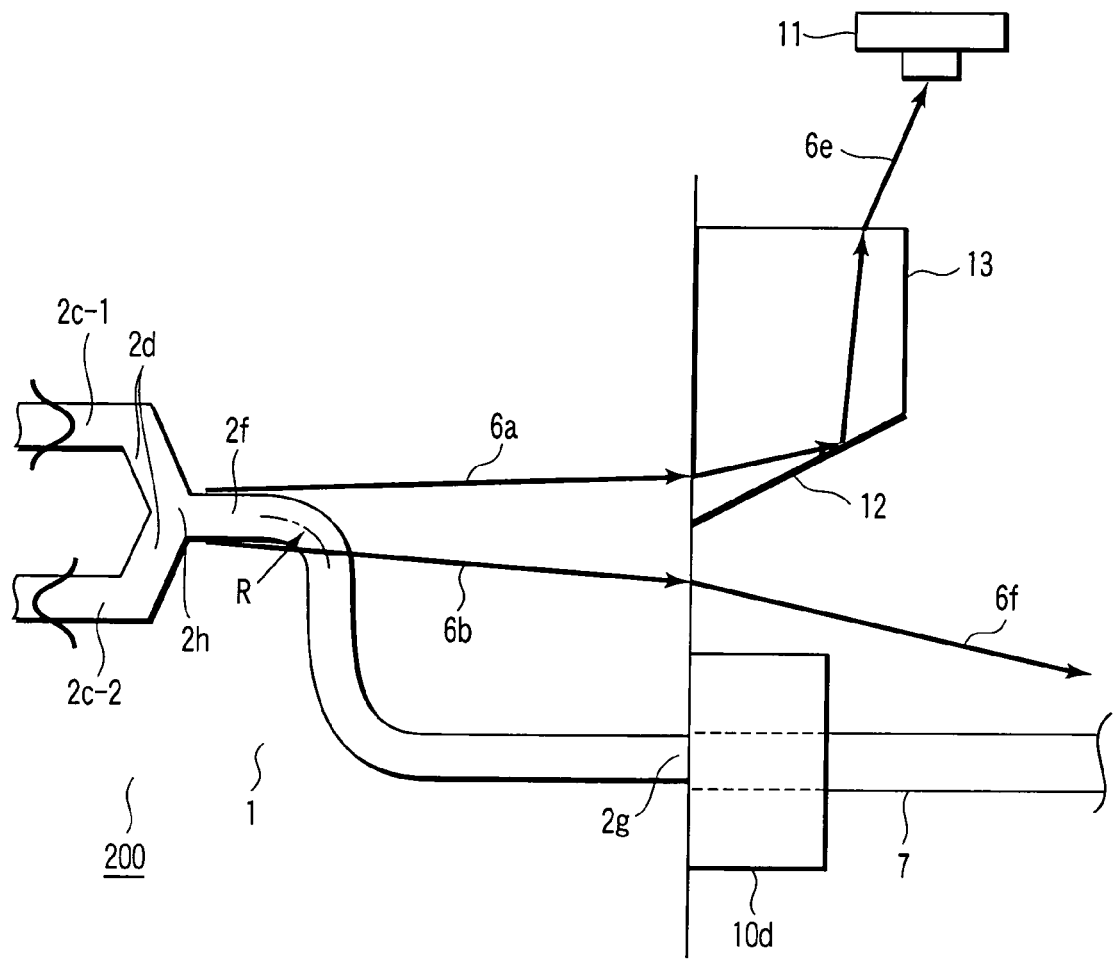
FIG. 10 is a top view showing a configuration of a main portion of an LN optical modulator which is applied as a fifth embodiment of the monitor photodetector-equipped optical modulator according to the present invention.
Figure 11:
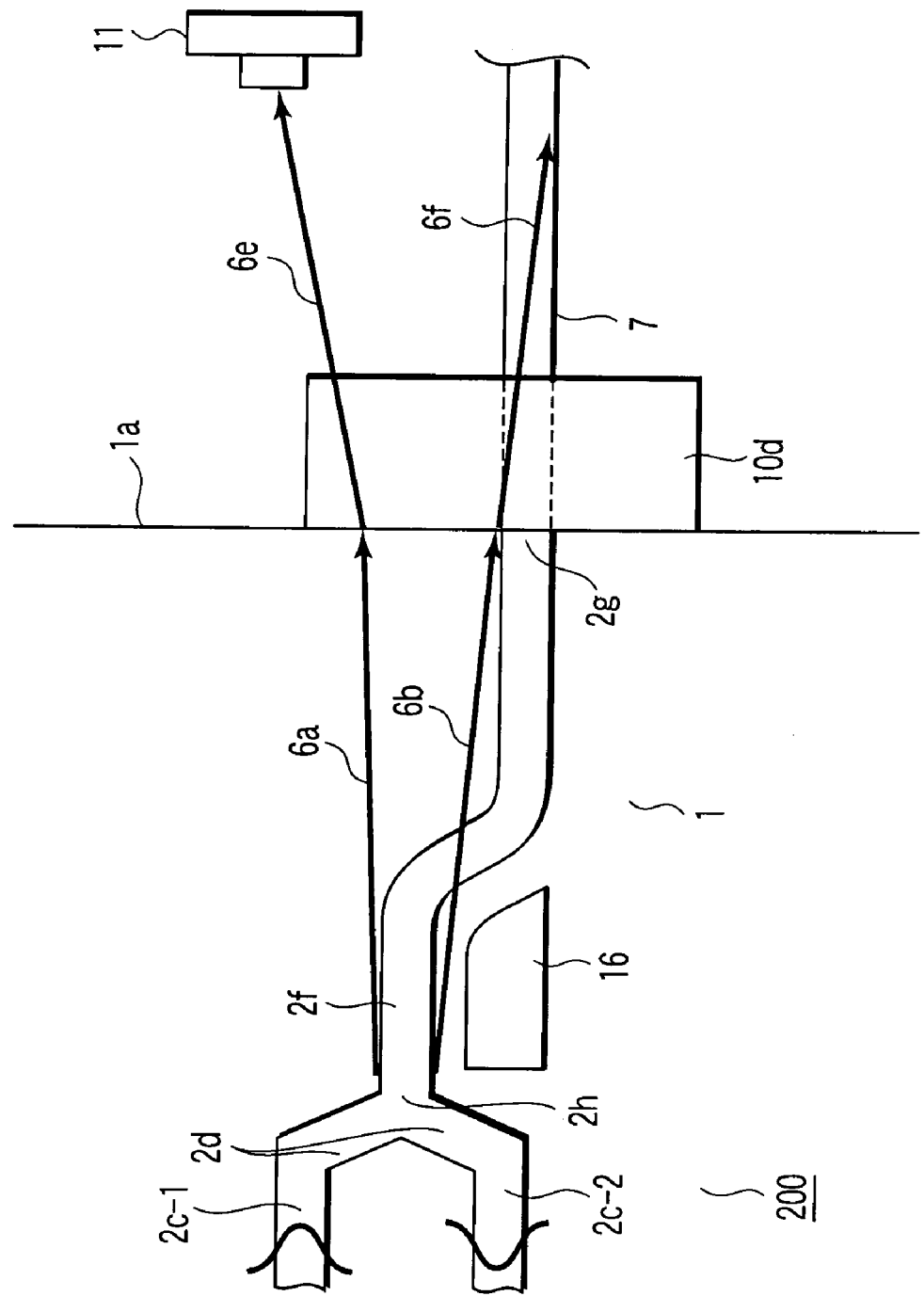
FIG. 11 is a top view showing a configuration of a main portion of an LN optical modulator which is applied as a sixth embodiment of the monitor photodetector-equipped optical modulator according to the present invention.
Figure 12:
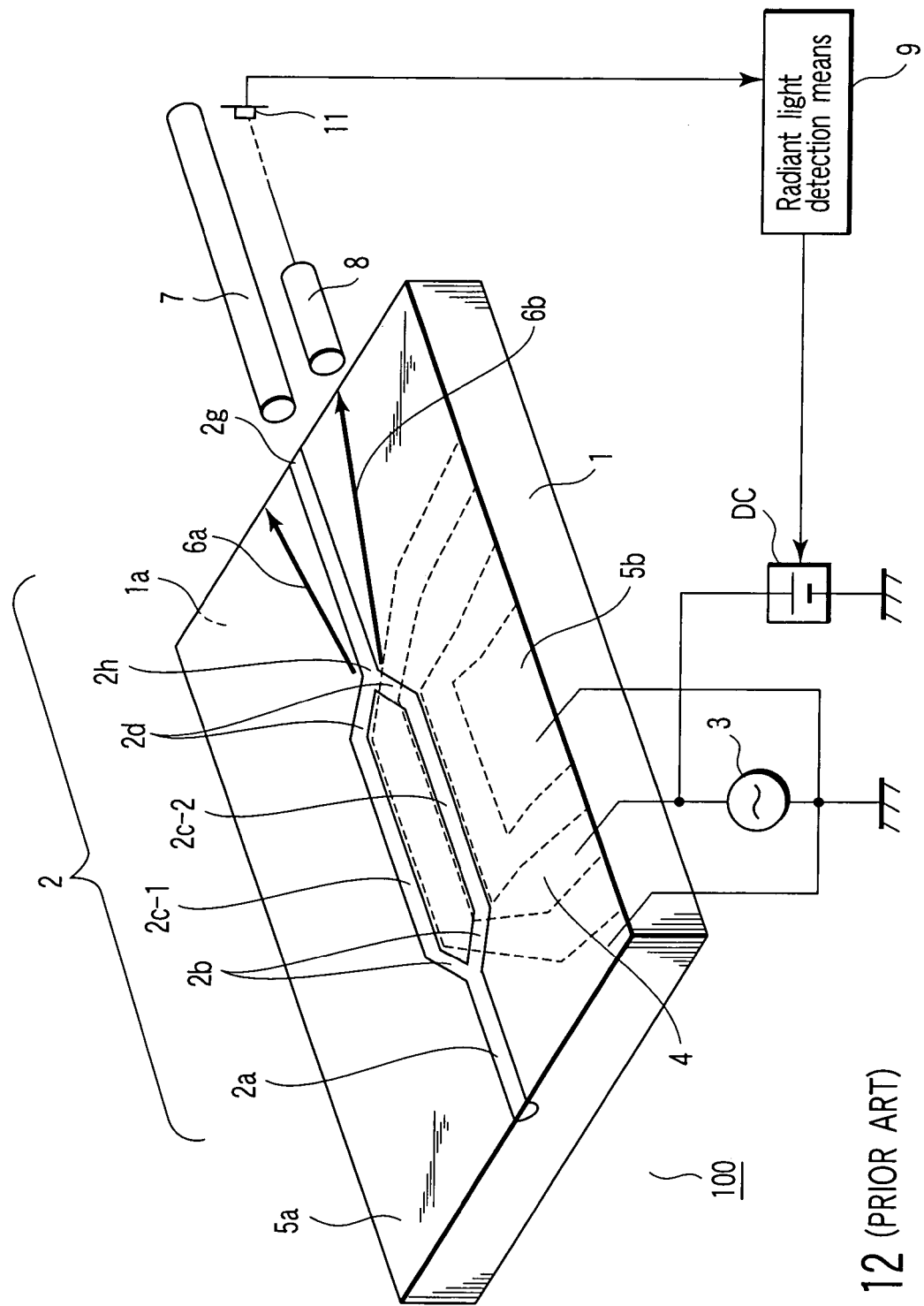
FIG. 12 is a perspective view showing a configuration of an LN optical modulator according to a first prior art disclosed in Patent Reference 1.
Figure 13A:
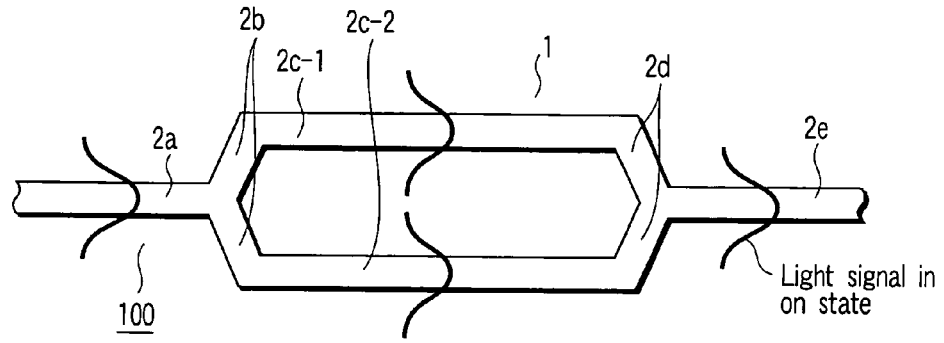
FIG. 13A is a view for explaining an operational principle of the LN optical modulator which is configured as shown in FIG. 12.
Figure 13B:
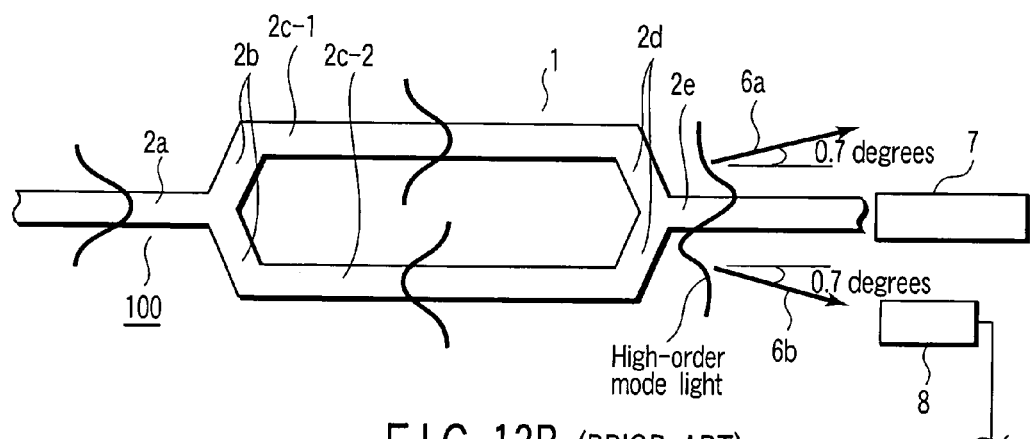
FIG. 13B is a view for explaining the operational principle of the LN optical modulator which is configured as shown in FIG. 12.
Figure 13C:
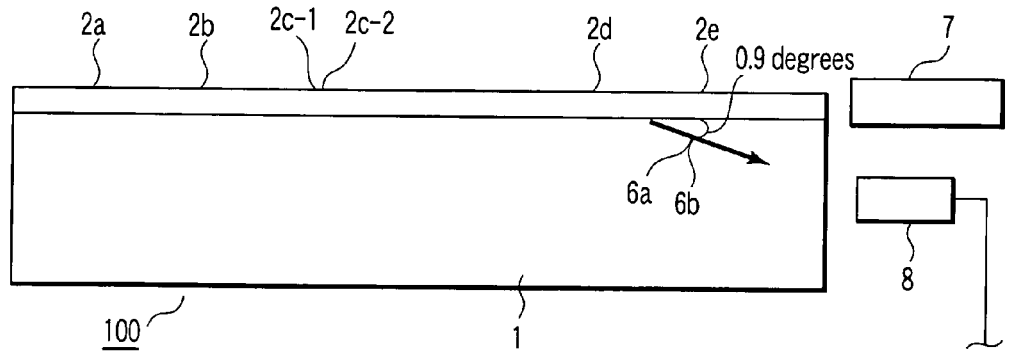
FIG. 13C is a view for explaining the operational principle of the LN optical modulator which is configured as shown in FIG. 12.
Figure 14:
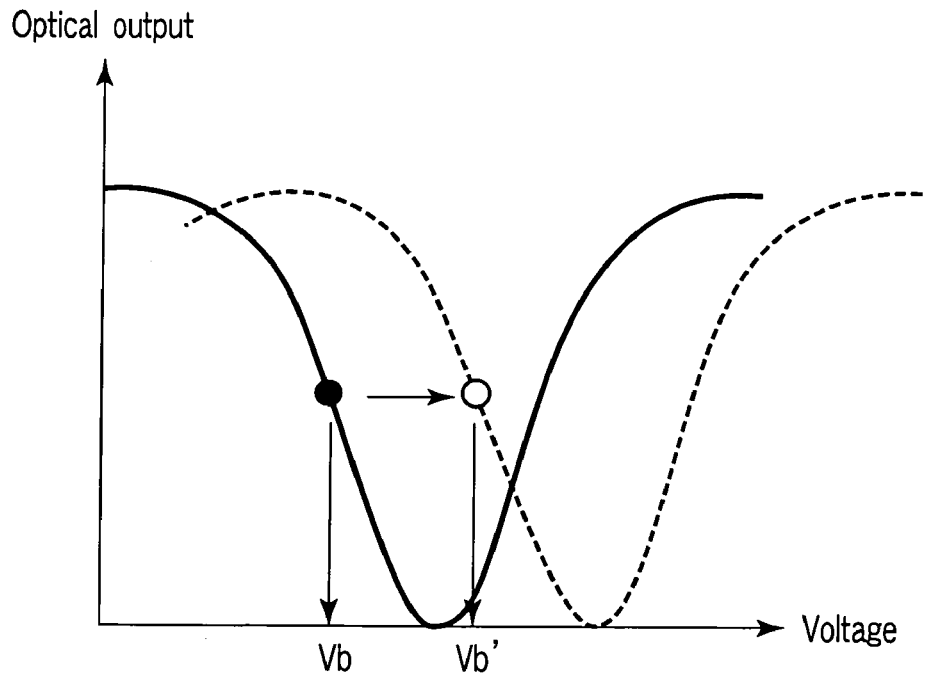
FIG. 14 is a view of a DC bias voltage-optical output characteristic curve for explaining the operational principle of the LN optical modulator which is configured as shown in FIG. 12.
Figure 15:
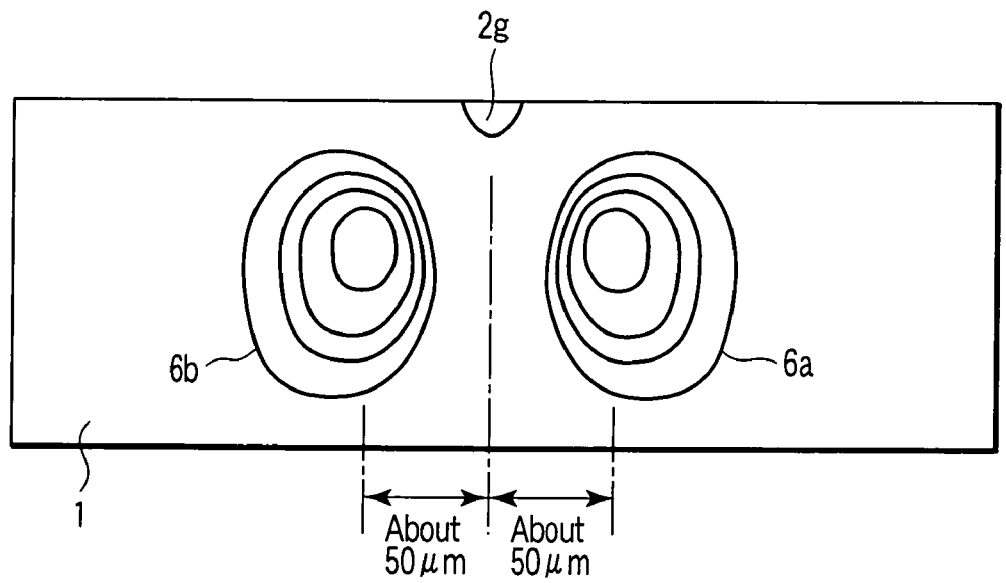
FIG. 15 is a view showing an optical signal off state when viewed from the single-mode optical fiber 7 for the signal light beam side.

In FIGS. 1 to 11 and 22, the same reference numeral as the first prior art shown in FIG. 12 corresponds to the same functional portion, so that the description of the functional portion designated by the same numeral will be neglected.

Figure 1:
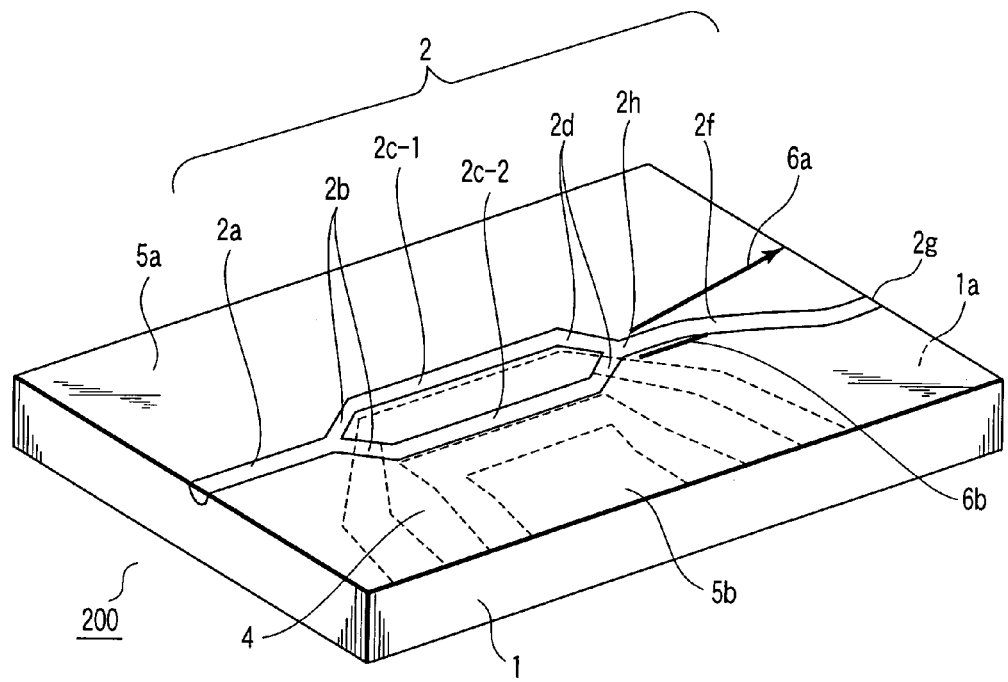
FIG. 1 is a perspective view showing a configuration of an LN optical modulator which is applied as a first embodiment of a monitor photodetector-equipped optical modulator according to the present invention.
Figure 3:
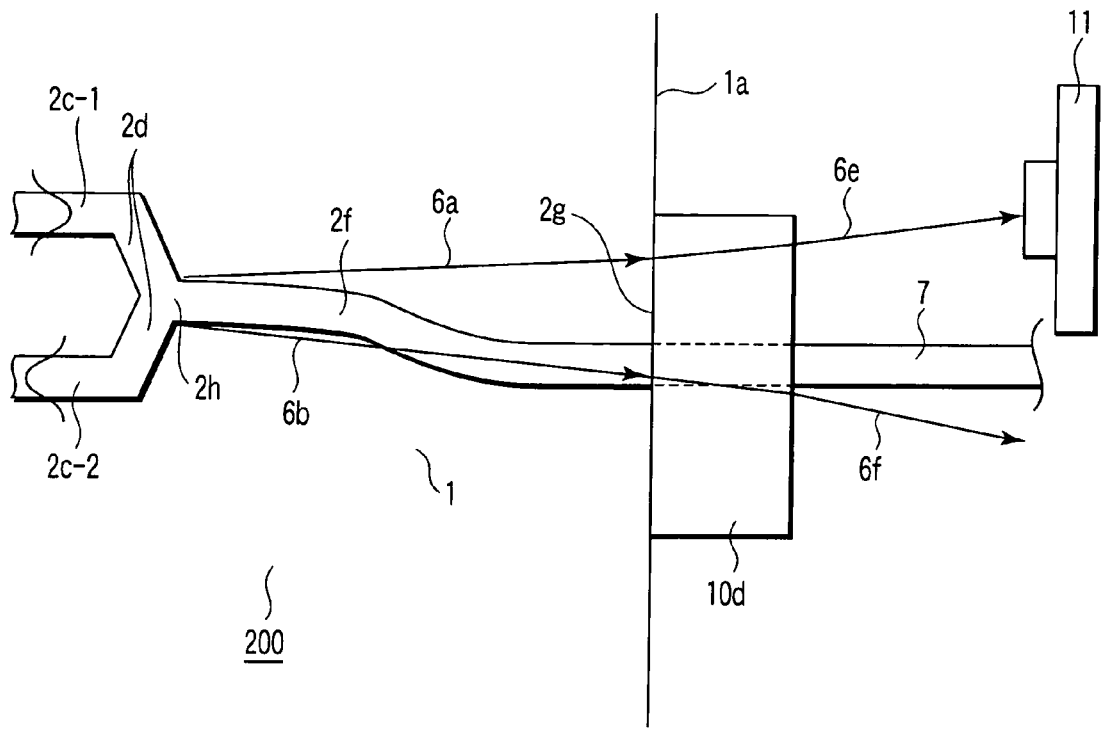
FIG. 3 is a top view of FIG. 1.

First a basic configuration of a monitor photodetector-equipped optical modulator according to the present invention will be described. As shown in FIG. 1 and FIG. 3, the monitor photodetector-equipped optical modulator according to the present invention includes an optical modulator 200 and a monitor photodetector 11. The optical modulator 200 includes the substrate 1, the optical waveguide 2, the center electrode 4, and at least one of the ground electrodes 5a and 5b. The substrate 1 has the electro-optic effect. The optical waveguide 2 which guides the light beam is formed on one surface side of the substrate. The center electrode 4 and the at least one of the ground electrodes 5a and 5b are applied therebetween the voltage for modulating the light beam guided by the optical waveguide. The optical waveguide 2 includes the input optical waveguide 2a, the two branching optical waveguides 2b and 2b, the two interaction optical waveguides 2c-1 and 2c-2, the multiplexing optical waveguide 2d, and the output optical waveguide 2f. The light beam is incident on the optical waveguide 2 through the input optical waveguide 2a. The two branching optical waveguides 2b and 2b guide the light beam incident on the input optical waveguide 2a while branching the light beam into two light beams. The two interaction optical waveguides 2c-1 and 2c-2 modulate each phase of the two light beams by applying the voltage between the center electrode 4 and the at least one of the ground electrodes 5a and 5b. The multiplexing optical waveguide 2d multiplexes the two light beams which propagate through the two interaction optical waveguides 2c-1 and 2c-2. The output optical waveguide 2f is connected to the multiplexing optical waveguide 2d through the multiplexing point 2h of the multiplexing optical waveguide 2d which multiplexes the two light beams. In the optical modulator 200, the high-order mode light beam which is generated by multiplexing the phase-modulated two light beams in the multiplexing optical waveguide 2d is radiated from the multiplexing point 2h to the inside of the substrate 1 as the two radiant light beams 6a and 6b, while the high-order mode light beam hardly propagates through the output optical waveguide 2f. The monitor photodetector 11 detects at least one of the two radiant light beams 6a and 6b radiated from the multiplexing point 2h to the inside of the substrate 1 of the optical modulator 200. The monitor photodetector-equipped optical modulator is characterized in that the output optical waveguide 2f is formed while deformed in order to secure a space for mounting the monitor photodetector 11 such that at least one of the optical axes of the radiant light beams 6a and 6b in the substrate facet 1a located on the output optical waveguide 2f of the substrate 1 and the end 2g of the output optical waveguide 2f are separated from each other by a predetermined distance.

First Embodiment

Figure 2:
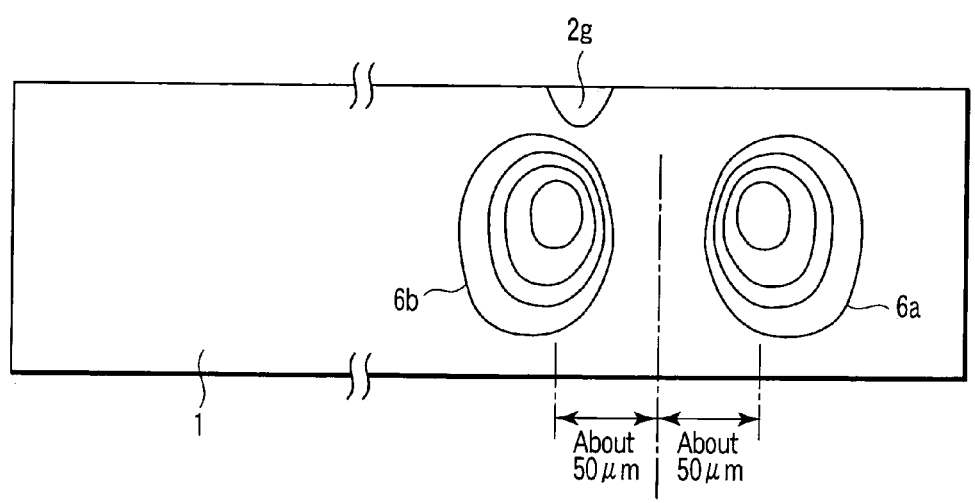
FIG. 2 is a side view of FIG. 1 when viewed from a single-mode optical fiber 7 for the signal light beam side.

FIG. 1 is a perspective view showing a configuration of an LN optical modulator 200 which is applied as a first embodiment of a monitor photodetector-equipped optical modulator according to the present invention. FIG. 2 is a side view of FIG. 1 when viewed from the single-mode optical fiber 7 for the signal light beam side as described later. FIG. 3 shows a top view of FIG. 1.

That is, in the LN optical modulator 200 which is applied as the first embodiment of the monitor photodetector-equipped optical modulator according to the present invention, as with the LN optical modulator 100 according to the first prior art shown in FIG. 12, the radiant light beams 6a and 6b propagate through the substrate 1 while having the small angles of 0.7 degrees with respect to the substrate horizontal direction and 0.9 degrees with respect to the depth direction.

In the LN optical modulator 200 applied as the first embodiment of the present invention, the output optical waveguide 2f is deformed to shift the optical axis of the output optical waveguide 2f from the multiplexing point 2h of the Y-branching type of multiplexing optical waveguide 2d toward the direction parallel to the surface of the LN substrate 1 by a predetermined amount in the surface direction of the LN substrate 1.

That is, as shown in FIG. 3, after the optical axis of the output optical waveguide 2f goes straight once, for example, the optical axis is deformed in the substantially reversed-S-shape, and then the optical axis is formed so as to extend straight to the substrate facet 1a.

The capillary 10d to which the single-mode optical fiber 7 for the signal light beam is fixed is arranged in the substrate facet 1a.

Thus, the optical axis of the output optical waveguide 2f and the propagating directions of the radiant light beams 6a and 6b are adapted to be separated from each other by deforming the optical axis of the output optical waveguide 2f.

Therefore, the monitor photodetector 11 such as the photodiode can easily be mounted to the LN optical modulator 200 independently of the single-mode optical fiber 7 for the signal light beam.

In the first embodiment, the radiant light beam 6e passes through the capillary 10d.

Figure 17:
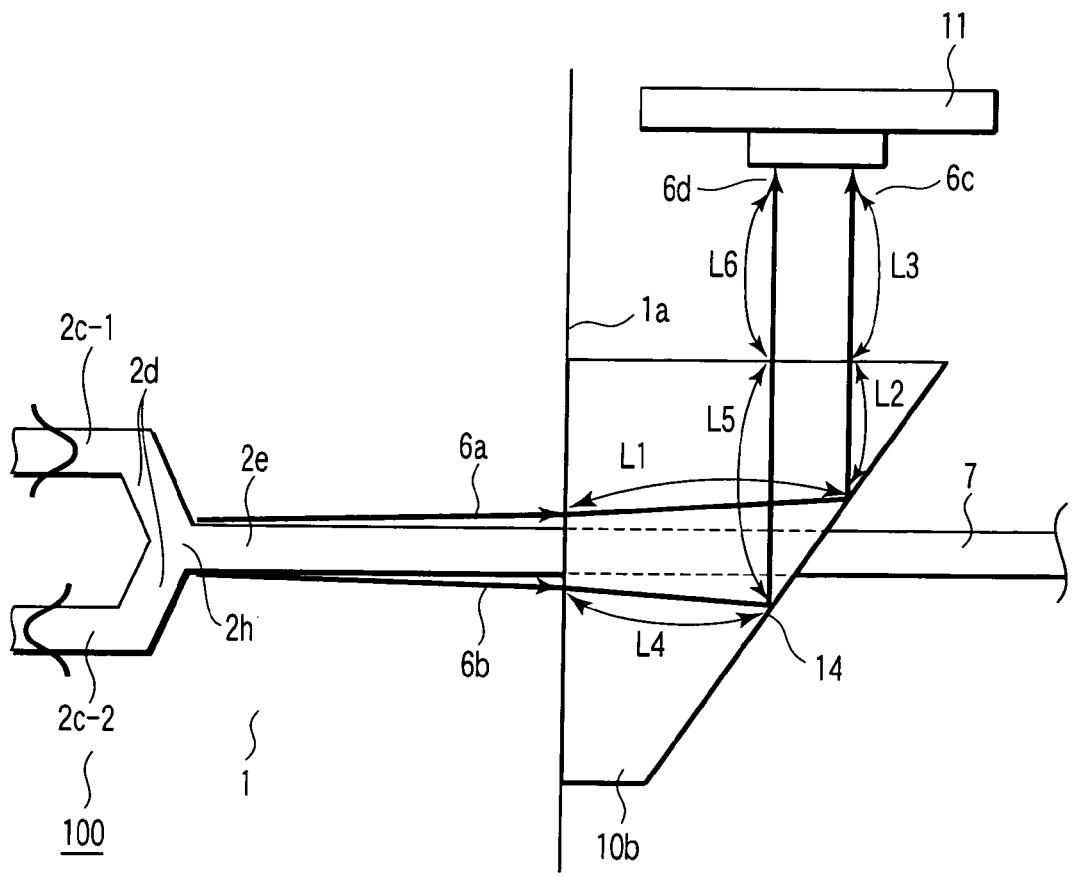
FIG. 17 is a top view showing a configuration of a main portion of the LN optical modulator according to a second prior art which is of the structure for solving the LN optical modulator problems caused by the first prior art.
Figure 18:
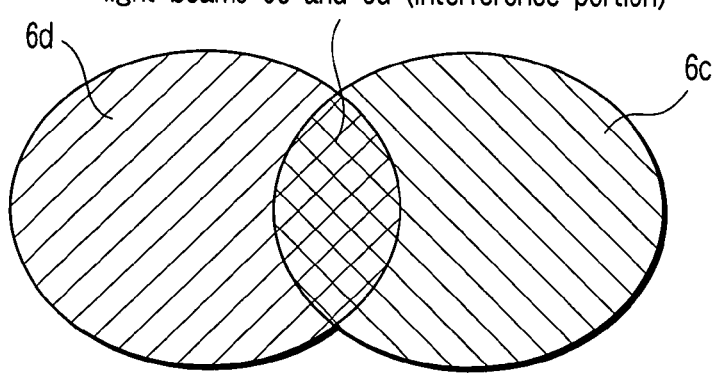
FIG. 18 is a view for explaining that the radiant light beams 6a and 6b interfere with each other when the radiant light beams 6a and 6b are incident on a monitor photodetector 11 such as a monitor photodiode.
Figure 21:
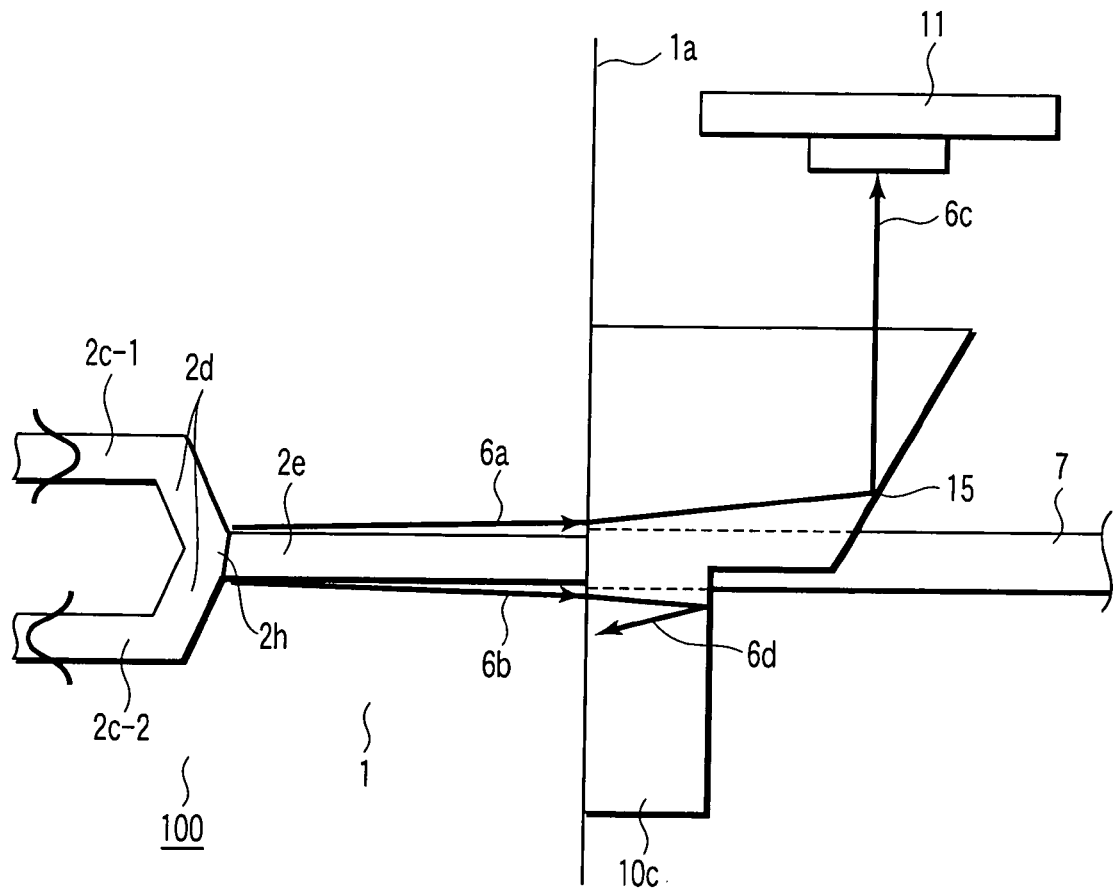
FIG. 21 is a top view showing a configuration of a main portion of the LN optical modulator according to a third prior art which is of the structure for solving the LN optical modulator problems caused by the second prior art.

That is, in the LN optical modulator 200, it is not necessary that the radiant light beam is reflected at the rear end of the capillary 10d, so that it is not necessary that the rear end is formed in the inclined plane to deposit the reflection film such as the dielectric multi-layer film 16 unlike the capillaries 10b and 10c of the second and third prior arts shown in FIG. 17 and FIG. 21.

Needless to say, the output optical waveguide 2f is not always perpendicular to the substrate facet 1a.

Because the radiant light beam 6e received by the monitor photodetector 11 such as the photodiode propagates through a place away from the single-mode optical fiber 7 for the signal light beam, the guide spot facing for introducing the single-mode optical fiber 7 for the signal light beam can be provided at the rear end of the capillary 10d, which allows the single-mode optical fiber 7 for the signal light beam to be easily mounted to the capillary 10d.

Therefore, in the LN optical modulator 200 according to the first embodiment, it is not necessary that the reflection film is formed in the capillary 10d and the guide spot facing can be provided in the capillary 10d, which allows production cost to be reduced as the optical modulator.

As can be seen from FIG. 3, In the case of the first embodiment, the output optical waveguide 2f and the radiant light beam 6b come close to the horizontal direction when viewed from the top face.

That is, in the optical modulator 200 according to the first embodiment and later-mentioned other embodiments of the invention, the output optical waveguide 2f is not shifted in the horizontal direction in order to avoid the interference between the radiant light beam and the signal light beam propagating through the output optical waveguide 2f.

In the LN optical modulator 200 according to the first embodiment of the invention, when compared with the means for causing the radiant light beam 6a to interfere with the signal light beam like Patent Reference 2, the signal light loss is hardly increased, and the distance between the single-mode optical fiber 7 for the signal light beam and the radiant light beam 6a can freely be set by pattern formation of the output optical waveguide 2f without being constrained by the pattern as shown in FIG. 2.

In the first embodiment, only the radiant light beam 6e is received by the monitor photodiode 11, and the radiant light beam 6f is radiated into the room. However, it is also possible that the radiant light beam 6f is received by another monitor photodiode or the like.

Figure 4:
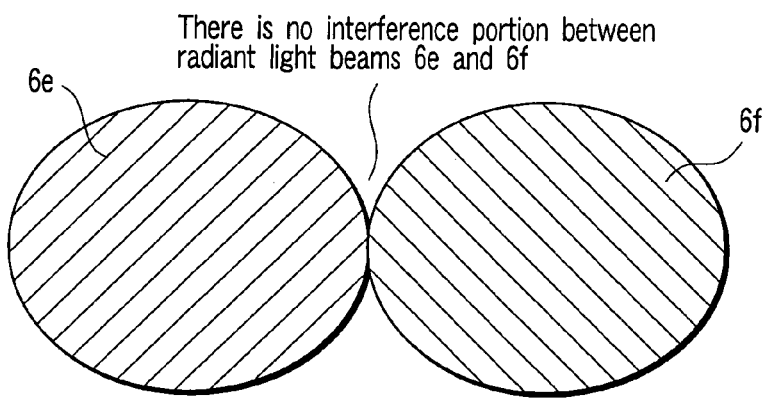
FIG. 4 is a view for explaining that a radiant pattern is shown and no interference portion exists in radiant light beams 6e and 6f when the radiant light beams 6e and 6f propagate through room in the LN optical modulator applied as the first embodiment.

FIG. 4 shows a radiant pattern when the radiant light beams 6e and 6f propagate through room in the LN optical modulator 200 according to the first embodiment of the present invention. Referring to FIG. 4, no interference portion exists in the radiant light beams 6e and 6f.

This is because, as shown in FIG. 3, the radiant light beams 6e and 6f are the high-order mode light beam which is generated at the multiplexing point 2h of the Y-branching type of multiplexing optical waveguide 2d constituting the Mach-Zehnder optical waveguide 2, and the interference is not generated between the high-order mode light beams, i.e., the radiant mode light beams 6a and 6b during the generation of the high-order mode light beam.

However, in the optical modulator 100 according to the second prior art, as described in FIG. 17, the overlapped portion is created to generate the interference due to the reflection in which the angles and the optical paths are different at the dielectric multi-layer film 14 located in the rear-end inclined surface of the capillary 10b. That is, in the optical modulator 100 according to the second prior art, there is the phase difference of π between the radiant light beam 6e and the radiant light beam 6f, so that it is noted that interference is easy to occur between the radiant light beam 6e and the radiant light beam 6f.

In contrast, in the optical modulator 200 according to the first embodiment, the reflection is not utilized and the geometric total optical lengths are equal to each other when the radiant light beams 6e and 6f pass through the capillary 10d, so that there is an advantage that the radiant light beams 6e and 6f do not interfere with each other.

Second Embodiment

Figure 5:
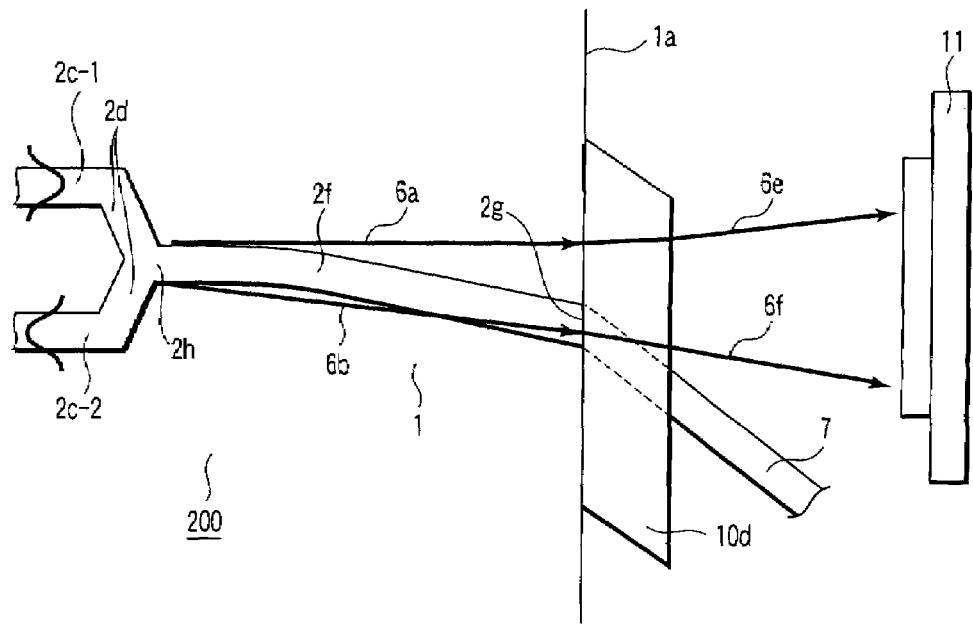
FIG. 5 is a top view showing a configuration of a main portion of an LN optical modulator which is applied as a second embodiment of the monitor photodetector-equipped optical modulator according to the present invention.

FIG. 5 is a top view showing the configuration of a main portion of the LN optical modulator 200 which is applied as a second embodiment of the monitor photodetector-equipped optical modulator according to the present invention.

In the second embodiment, because the output optical waveguide 2*f* near the substrate facet 1*a* is obliquely formed with respect to the substrate facet 1*a*, the single-mode optical fiber 7 for the signal light beam is also obliquely fixed, which broadens the space in which the monitor photodetector 11 such as the photodiode is arranged.

In this case, the two radiant light beams 6*e* and 6*f* also experience no reflection before the two radiant light beams 6*e* and 6*f* are incident on the monitor photodetector 11 such as the photodiode, and the optical phases of the two radiant light beams 6*e* and 6*f* are substantially equal to each other in the capillary 10*d*. Therefore, unlike the second prior art shown in FIG. 17, interference is not generated between the radiant light beams 6*e* and 6*f*.

Figure 19:
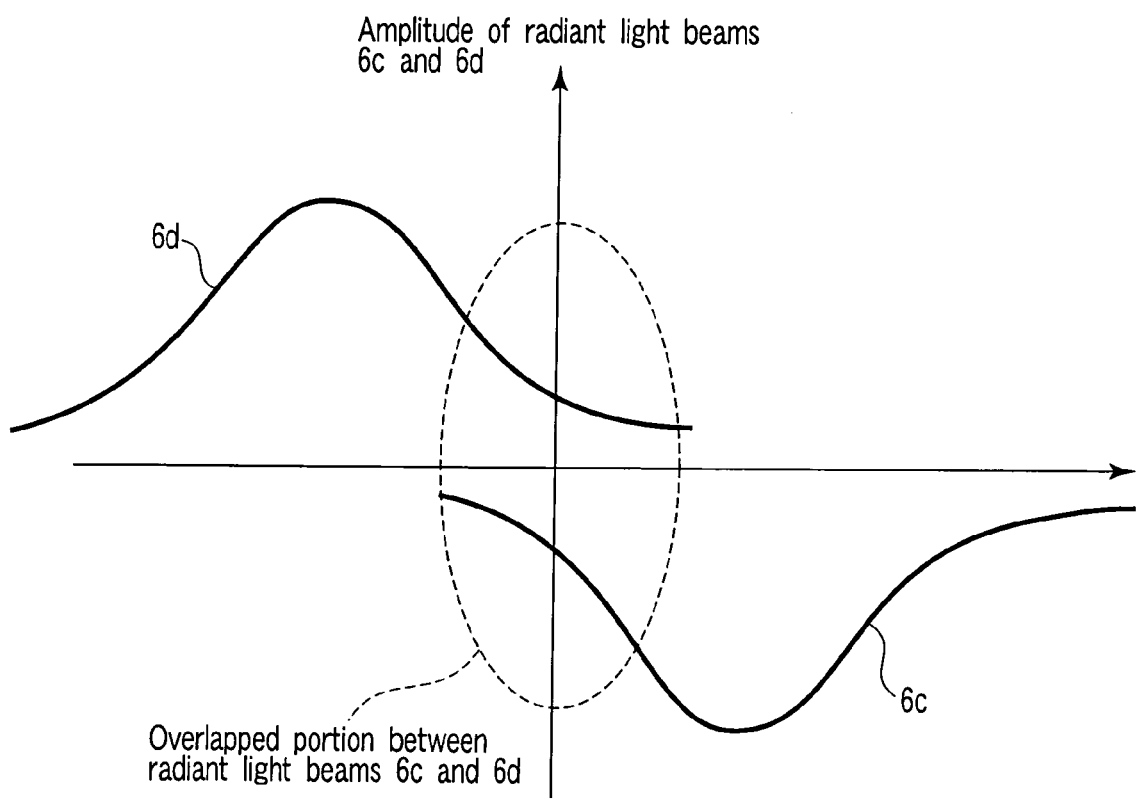
FIG. 19 is a view for explaining a state in which phases of radiant light beams 6c and 6d differ from each other by about 180 degrees.
Figure 20A:
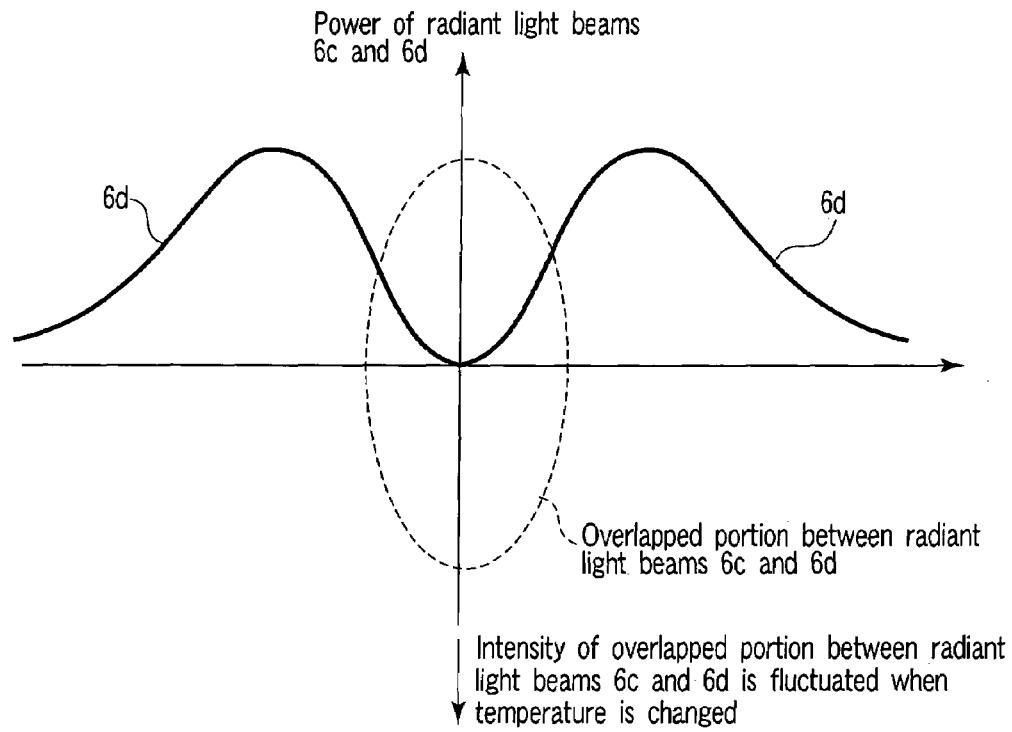
FIG. 20A is a view for explaining that a point where powers of the radiant light beams 6c and 6d become zero exists in an overlapped portion when the phases of the radiant light beams 6c and 6d differ from each other by about 180 degrees, and for explaining that the overlapped portion between the radiant light beams 6c and 6d never becomes zero at any point because a phase difference between the radiant light beams 6c and 6d is different from 180 degrees as a result of temperature change.
Figure 20B:
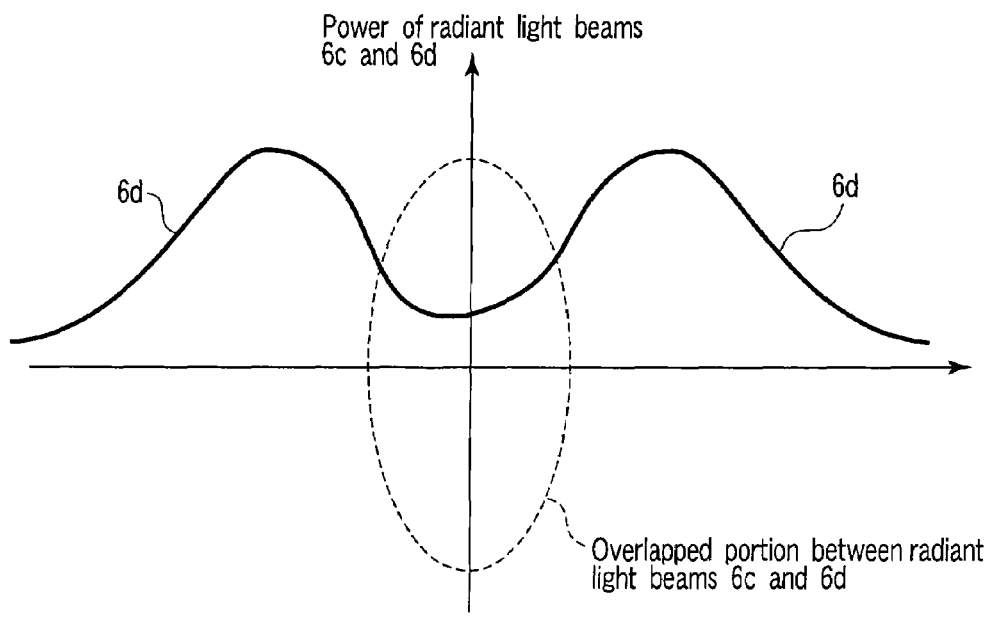
FIG. 20B is a view for explaining that a point where powers of the radiant light beams 6c and 6d become zero exists in an overlapped portion when the phases of the radiant light beams 6c and 6d differ from each other by about 180 degrees, and for explaining that the overlapped portion between the radiant light beams 6c and 6d never becomes zero at any point because a phase difference between the radiant light beams 6c and 6d is different from 180 degrees as a result of temperature change.

As a result, in the monitor photodetector-equipped optical modulator according to the second embodiment, because the two radiant light beams 6*e* and 6*f* are received by the monitor photodetector 11 such as the photodiode, there is the excellent advantage that photocurrent which can be used for the DC bias control doubles when compared with the third prior art in which only one radiant light beam 6*c* is received as shown in FIG. 19.

In the case where one of the radiant light beams 6*e* and 6*f*, e.g., only the radiant light beams 6*e* is received, it will be obvious that the present invention can exert the effect while the photocurrent becomes half.

Third Embodiment

Figure 6:
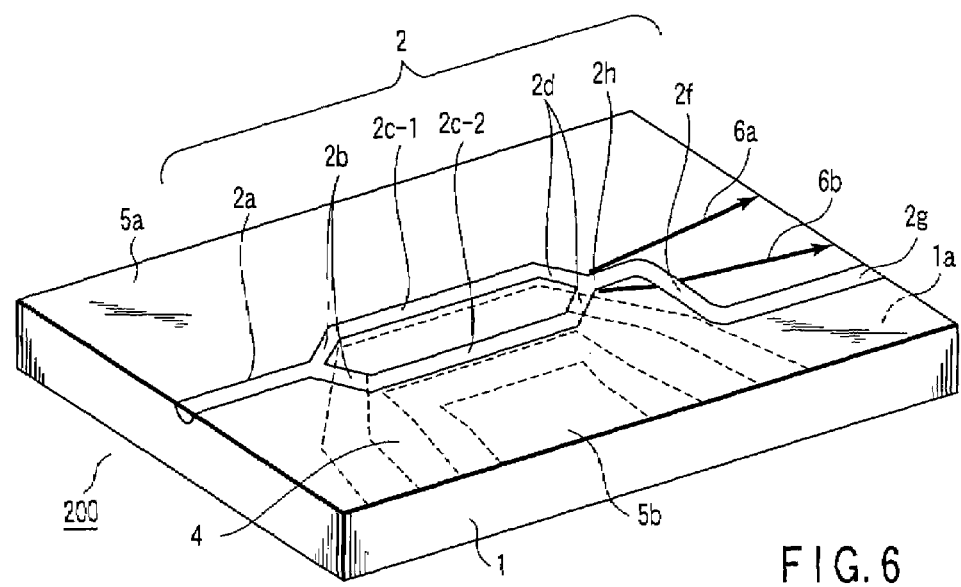
FIG. 6 is a perspective view showing a configuration of an LN optical modulator which is applied as a third embodiment of the monitor photodetector-equipped optical modulator according to the present invention.
Figure 7:
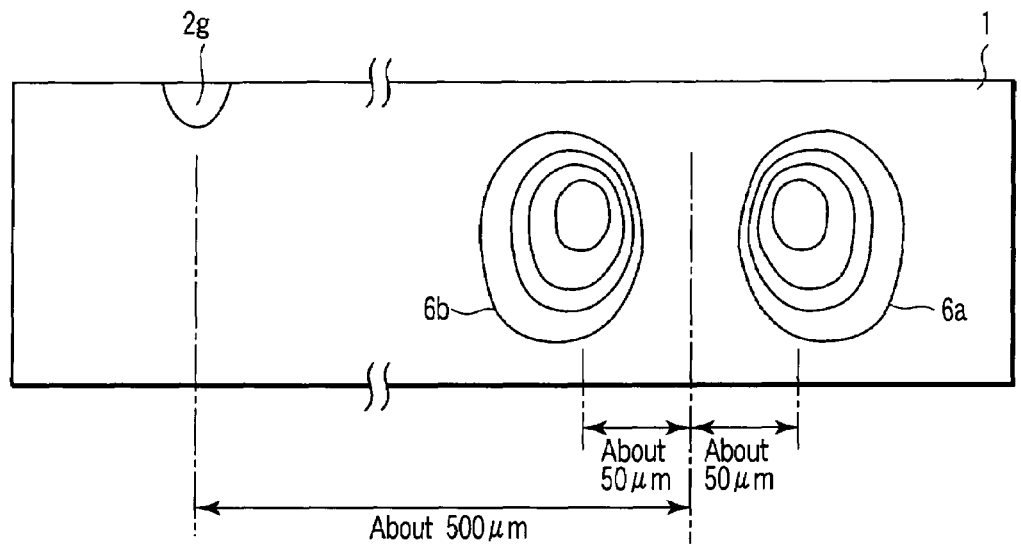
FIG. 7 is a side view of FIG. 6 when viewed from the single-mode optical fiber 7 for the signal light beam side.

FIG. 6 is a perspective view showing the configuration of the LN optical modulator 200 which is applied as a third embodiment of the monitor photodetector-equipped optical modulator according to the present invention. FIG. 7 is a side view of FIG. 6 when viewed from the single-mode optical fiber 7 for the signal light beam side as described later.

In the LN optical modulator 200 according to the third embodiment, when the electric signal is not applied between the traveling-wave electrode center electrode 4 and the ground electrodes 5*a* and 5*b*, the light beam propagating through the interaction optical waveguides 2*c*-1 and 2*c*-2 is multiplexed in the multiplexing optical waveguide 2*d*, and then the light beam is output to and propagates through the output optical waveguide 2*f* as the light beam having the ON state.

In the LN optical modulator 200 according to the third embodiment, as with the first prior art shown in FIG. 12, the radiant light beams 6*a* and 6*b* propagate through the substrate 1 while having the small angles of 0.7 degrees with respect to the substrate horizontal direction and 0.9 degrees with respect to the depth direction.

In the LN optical modulator 200 according to the third embodiment, the significant point of it is that the output optical waveguide 2*f* is deformed to largely shift the optical axis of the output optical waveguide 2*f* toward the direction parallel to the surface of the LN substrate 1 from the multiplexing point 2*h* of the Y-branching type of multiplexing optical waveguide 2*d*.

Therefore, in the LN optical modulator 200 according to the third embodiment, the output optical waveguide 2*g* and the radiant light beams 6*a* and 6*b* are formed while separated from each other in the direction parallel to the surface of the in the LN substrate 1 in the LN substrate facet 1*a*.

Figure 16A:
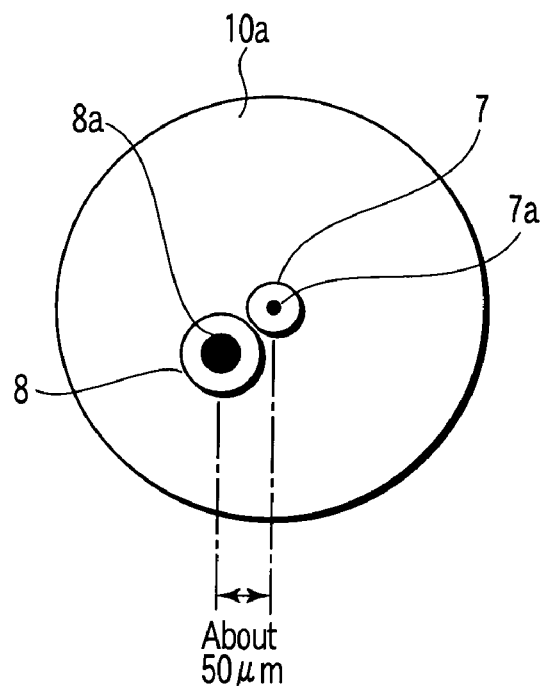
FIG. 16A is a view for explaining that the single-mode optical fiber 7 for the signal light beam and a optical fiber 8 for receiving light beam are extremely difficult to mount.
Figure 16B:
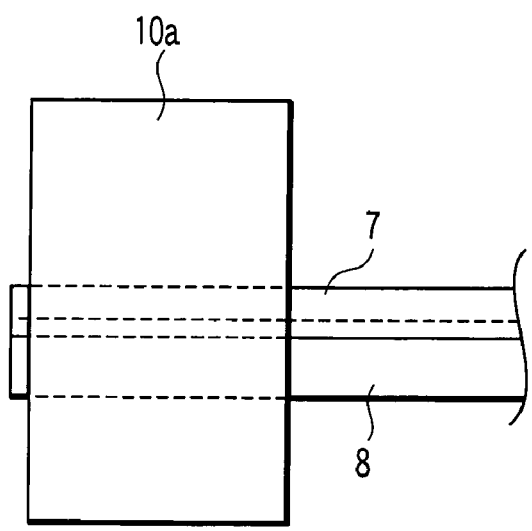
FIG. 16B is a view for explaining that the single-mode optical fiber 7 for the signal light beam and the optical fiber 8 for receiving the radiant light beam are extremely difficult to mount.

Accordingly, in the LN optical modulator 200 according to the third embodiment, unlike the first prior art shown in FIG. 16, the radiant light beams 6*a* and 6*b* can be monitored at a place located far away from the single-mode optical fiber 7 for the signal light beam fixed to the capillary 10*d* as shown in the later-mentioned specific example of FIG. 8, which greatly facilitates the mounting of the single-mode optical fiber 7 for the signal light beam and the mounting of the monitor photodetector 11 such as the photodiode for controlling the bias voltage.

Then, a specific structure of the LN optical modulator 200 according to the third embodiment will be described with reference to FIG. 8.

Figure 8:
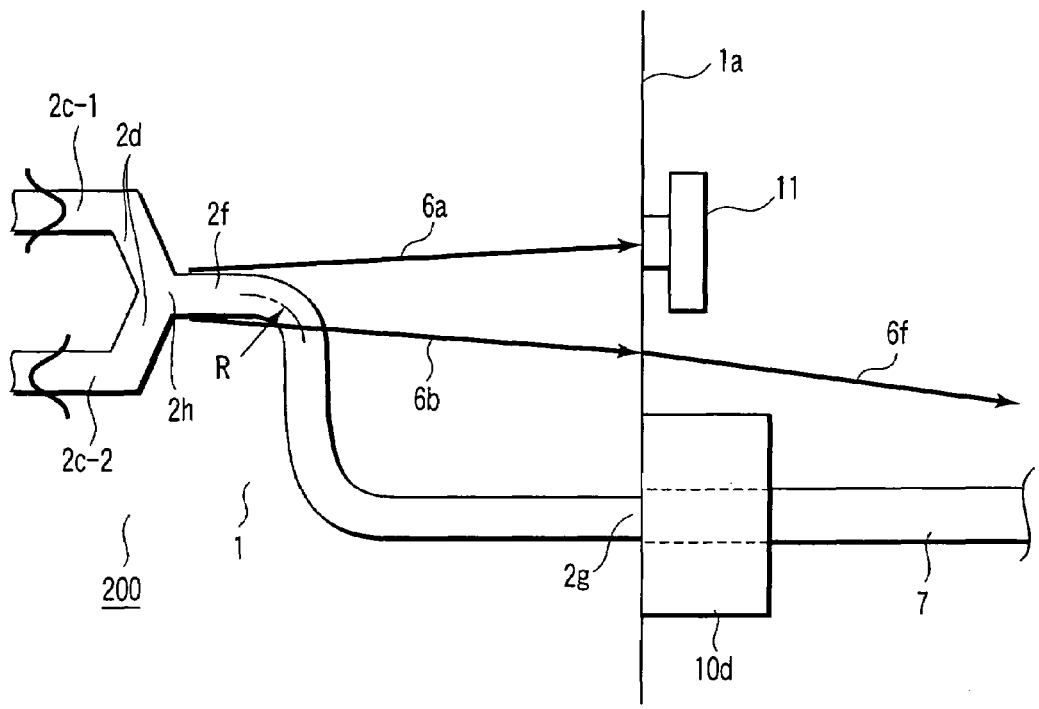
FIG. 8 is a top view of the main portion for explaining a specific structure of the LN optical modulator according to the third embodiment.

As shown in FIG. 8, in the LN optical modulator 200 according to the third embodiment, after the optical axis of the output optical waveguide 2*f* goes straight once, the optical axis is deformed in the substantially reversed-S-shape with a curvature radius of R, and then the optical axis is formed so as to extend straight to the substrate facet 1*a*.

The monitor photodetector 11 such as the photodiode and the capillary 10*d* to which the single-mode optical fiber 7 for the signal light beam is fixed are arranged in the substrate facet 1*a*.

Thus, in the LN optical modulator 200 according to the third embodiment, the optical axis of the output optical waveguide 2*f* and the propagating directions of the radiant light beams 6*a* and 6*b* are adapted to be largely separated from each other by largely deforming the optical axis of the output optical waveguide 2*f*.

Therefore, in the LN optical modulator 200 according to the third embodiment, the monitor photodetector 11 such as the photodiode can be mounted independently of the single-mode optical fiber 7 for the signal light beam.

In the LN optical modulator 200 according to the third embodiment, the signal light loss is hardly increased, when compared with the means for causing the radiant light beam 6*a* to interfere with the signal light beam, which is described in Patent Reference 2.

In the LN optical modulator 200 according to the third embodiment, the distance between the single-mode optical fiber 7 for the signal light beam and the radiant light beam 6*a* can freely be set by the pattern formation of the output optical waveguide 2*f* without being constrained by the pattern as shown in FIG. 6.

In the third embodiment, as shown in FIG. 7, the distance between the optical axis of the output optical waveguide 2*f* and the propagating directions of the radiant light beams 6*a* and 6*b* is set at about 500 μm. However, the distance can be set at 1 mm or more as necessary.

In the third embodiment, only the radiant light beam 6*a* is received by the monitor photodetector 11 such as the photodiode and the radiant light beam 6*b* is radiated into the room as the radiant light beam 6*f*. However, it is also possible that the radiant light beam 6*f* is also received by another monitor photodetector or the like.

As described in the second prior art shown in FIG. 17, it is noted that the interference is easy to occur between the radiant light beam 6*e* and the radiant light beam 6*f* because there is the phase difference of π between the radiant light beam 6*e* and the radiant light beam 6*f*. However, the reflection is not utilized in the third embodiment, so that there is the advantage that the radiant light beams 6*e* and 6*f* do not interfere with each other.

Fourth Embodiment

Figure 9:
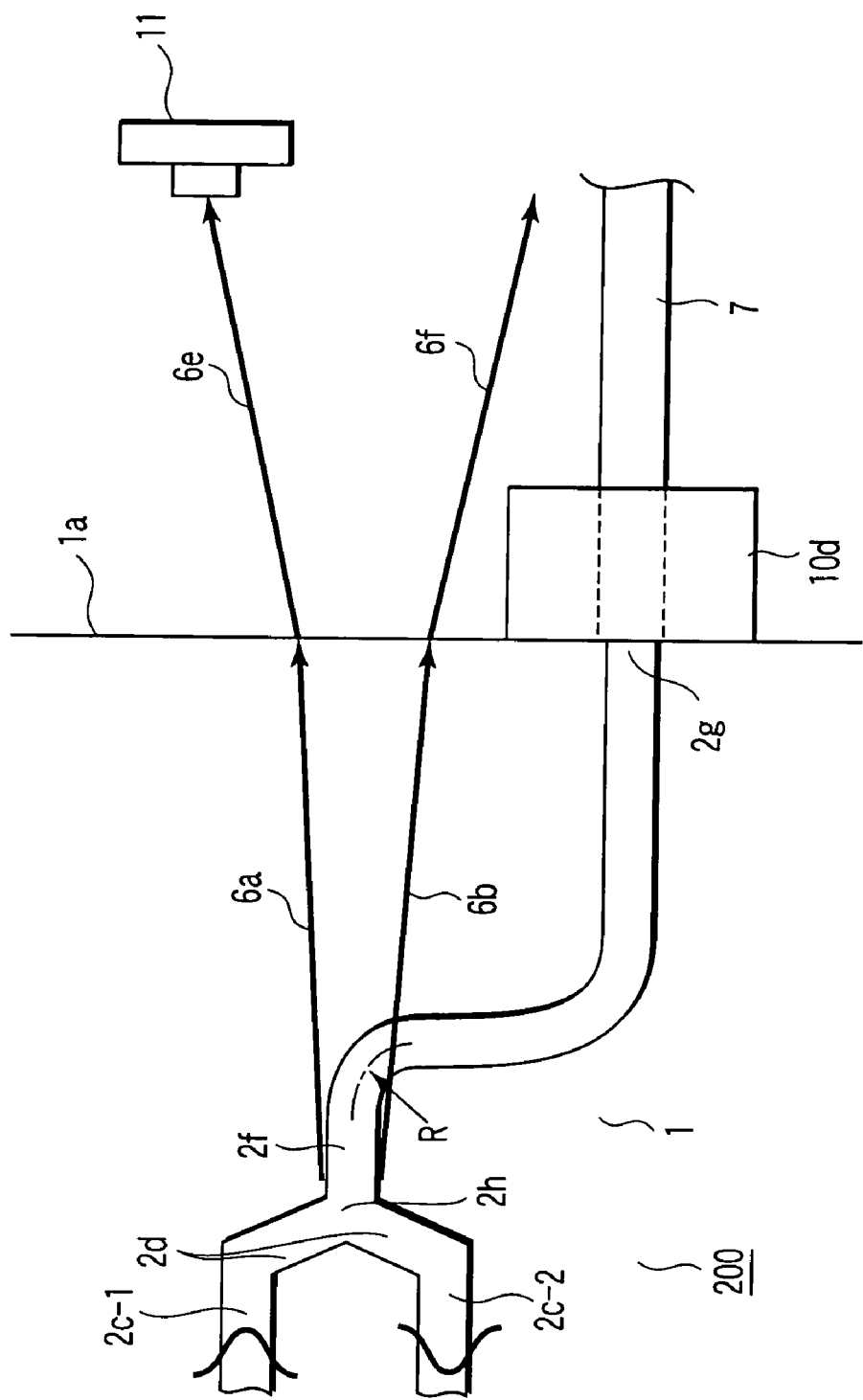
FIG. 9 is a top view showing a configuration of a main portion of an LN optical modulator which is applied as a fourth embodiment of the monitor photodetector-equipped optical modulator according to the present invention.

FIG. 9 is a top view showing the configuration of the main portion of the LN optical modulator 200 which is applied as a fourth embodiment of the monitor photodetector-equipped optical modulator according to the present invention.

The fourth embodiment differs from the third embodiment in an installation position of the monitor photodetector 11 such as the photodiode.

In the third embodiment, when the monitor photodetector 11 such as the photodiode is separated from the z-cut LN substrate 1 toward the longitudinal direction of the single-mode optical fiber 7 for the signal light beam, the position through which the radiant light beam 6e propagates is separated from the single-mode optical fiber 7 for the signal light beam, which further facilitates the mounting of the monitor photodetector 11 such as the photodiode.

Fifth Embodiment

FIG. 10 is a top view showing the configuration of the main portion of the LN optical modulator 200 which is applied as a fifth embodiment of the monitor photodetector-equipped optical modulator according to the present invention.

In the fifth embodiment, after the optical axis of the radiant light beam 6a is bent like the optical axis of the radiant light beam 6e by bonding a glass block 13 having the mirror portion 12 to the z-cut LN substrate 1, the radiant light beam 6a is received by the monitor photodetector 11 such as the photodiode.

Since the above structure is adopted in the fifth embodiment, the monitor photodetector 11 such as the photodiode can be mounted independently of the single-mode optical fiber 7 for the signal light beam, and the monitor photodetector 11 such as the photodiode can be mounted at an arbitrary position.

It is obvious that other blocks through which the light beam can pass may be used instead of the glass block 13.

Sixth Embodiment

FIG. 11 is a top view showing the configuration of the main portion of the LN optical modulator 200 which is applied as a sixth embodiment of the monitor photodetector-equipped optical modulator according to the present invention.

The sixth embodiment can be applied to the case in which only the radiant light beam 6a is received in the two radiant light beams 6a and 6b radiated from the multiplexing point 2h of the multiplexing optical waveguide 2d.

That is, in the sixth embodiment, the power of the radiant light beam 6b is decreased as much as possible by using a light absorption metal 16 which is of an absorption medium absorbing the light as an optical power attenuation mechanism. The optical power attenuation mechanism is provided between the multiplexing point 2h and the substrate facet 1a on the output optical waveguide 2d side of the substrate 1 such that the radiant light beam 6b in the two radiant light beams 6a and 6b radiated from the multiplexing point 2h of the multiplexing optical waveguide 2d is attenuated while the radiant light beam 6b propagates toward the substrate facet 1a.

A point where the light absorption metal 16 is formed on the z-cut LN substrate 1 is previously dug by etching, and the light absorption metal 16 is formed in the dug point. Therefore, the radiant light beam 6b in the two radiant light beams 6a and 6b radiated obliquely downward in the z-cut LN substrate 1 can largely be absorbed.

In this case, because the light-reception power by the monitor photodetector 11 such as the photodiode becomes half, the sixth embodiment is not as effective as the embodiments described above. However, the operation can be performed as the embodiment of the present invention.

In the case where the monitor photodetector 11 such as the photodiode is operated by utilizing the reflected light, the interference between the radiant light beams 6e and 6f can effectively be suppressed by adopting the configuration in which only the radiant light beam 6b is absorbed in the two radiant light beams 6a and 6b.

Seventh Embodiment

FIG. 22 is a top view showing the configuration of the main portion of the LN optical modulator 200 which is applied as a seventh embodiment of the monitor photodetector-equipped optical modulator according to the present invention.

In the seventh embodiment, the facet on the radiant light beam outgoing side of the capillary 10d in the first embodiment of the present invention as shown in FIG. 3 is obliquely formed so as not to be parallel to the facet on the substrate facet 1a side of the capillary 10d, which is formed on the LN substrate 1.

Therefore, after the radiant light beam 6e is output from the capillary 10d, the radiant light beam 6e is refracted at a larger angle, so that the radiant light beam 6e further goes away from the single-mode optical fiber 7 for the signal light beam.

Accordingly, the mounting of the monitor photodetector 11 is further facilitated.

In the seventh embodiment, it is possible that the two facets of the capillary 10d are formed in substantially parallel with each other while the substrate facet 1a of the LN substrate 1 is inclined. Further, it is possible that the substrate facet 1a of the LN substrate 1 is inclined and the two end faces of the capillary 10d are formed so as not to be parallel to each other like the seventh embodiment.

The idea, in which the substrate facet 1a of the LN substrate 1 is inclined and the two end faces of the capillary 10d are formed so as not to be parallel to each other, can obviously be applied to other embodiments of the invention.

The case in which the z-cut LN substrate is used as the LN substrate is described in the above embodiments. However, various substrates such as an x-cut substrate and a y-cut LN substrate may be used.

The method of fixing the single-mode optical fiber 7 for the signal light beam to the end face of the z-cut LN substrate 1 through the capillary 10d is described in the above embodiments. However, an optical system in which a lens is used may be adopted instead of the method as described above.

When the distance in which the output optical waveguide 2f is shifted toward the direction parallel to the surface of the LN substrate 1 is appropriately set, it is also possible that the monitor photodetector 11 such as the photodiode is directly placed at the rear end of the capillary 10d.

Although the facet of the z-cut LN substrate 1 is shown while formed in perpendicularly, it is obvious that the facet may be obliquely formed.

In the above descriptions, the output optical waveguide is formed straight to a certain distance from the multiplexing point of the multiplexing optical waveguide toward the facet of the substrate. However, the output optical waveguide may immediately be shifted from the multiplexing point toward the direction parallel to the substrate surface.

It is not always necessary that the pattern on the output optical waveguide is substantially formed in the reversed-S-shape, so that various patterns such as a line and an arc can be used, and the output optical waveguide may be formed to the substrate facet while shifted toward the direction parallel to the substrate surface.

Further, it is obvious that the optical waveguide through which one of the radiant light beams 6a and 6b propagates may be provided.

The distance between the single-mode optical fiber 7 for the signal light beam and the radiant light beam can further be increased at the substrate facet of the LN optical modulator by bending the optical waveguide such that the radiant light beam propagates in the direction in which the radiant light beam goes away from the single-mode optical fiber 7 for the signal light beam, which allows the monitor photodetector such as the photodiode to be mounted more easily.

In the above descriptions, it is assumed that a coplanar waveguide (CPW) type of traveling-wave electrode is used as the electrode. However, traveling-wave electrodes having the different structures such as an asymmetrical coplanar strip (ACPS) may be used, and a lumped constant electrode may be used.

In the above descriptions, it is assumed that the LN substrate is used as the substrate. However, other dielectric substrates such as lithium tantalate and semiconductor substrates may be used.

Consequently, according to the invention, the problems caused by the prior arts can be solved, and an optical modulator which is equipped with a small monitor photodetector having a stable operating state while facilitating mounting the monitor photodetector can be provided.

The invention claimed is:

1. A monitor photodetector-equipped optical modulator comprising:
   an optical modulator having a substrate, an optical waveguide, a center electrode, and at least one ground electrode, wherein the substrate has an electro-optic effect, the optical waveguide guides a light beam and is formed on one surface side of the substrate, and the center electrode and the at least one ground electrode have a voltage applied therebetween for modulating the light beam guided by the optical waveguide, wherein the optical waveguide includes an input optical waveguide, two branching optical waveguides, two interaction optical waveguides, a multiplexing optical waveguide, and an output optical waveguide, wherein the light beam is incident on the optical waveguide through the input optical waveguide, the two branching optical waveguides guide the light beam incident on the input optical waveguide while branching the light beam into two light beams, the two interaction optical waveguides modulate each phase of the two light beams by applying the voltage between the center electrode and the at least one ground electrode, the multiplexing optical waveguide multiplexes the two light beams which propagate through the two interaction optical waveguides, and the output optical waveguide is connected to the multiplexing optical waveguide through a multiplexing point of the multiplexing optical waveguide which multiplexes the two light beams, and wherein a high-order mode light beam which is generated by multiplexing the phase-modulated two light beams in the multiplexing optical waveguide is radiated from the multiplexing point to inside the substrate as two radiant light beams while the high-order mode light beam does not substantially propagate through the output optical waveguide in the optical modulator; and
   a monitor photodetector which is disposed outside the substrate except on said one surface side of the substrate, and which detects at least one of the two radiant light beams radiated from the multiplexing point inside the substrate of the optical modulator,
   wherein the output optical waveguide of the optical modulator is formed while being deformed in order to secure a space for mounting the monitor photodetector such that at least one of optical axes of the radiant light beams in a substrate facet located on the output optical waveguide and an edge portion of the output optical waveguide are separated from each other by a predetermined distance.

2. A monitor photodetector-equipped optical modulator according to claim 1, wherein the output optical waveguide is formed while a position of the multiplexing point in a direction orthogonal to a longitudinal direction of the substrate differs from a position of the edge portion of the output optical waveguide.

3. A monitor photodetector-equipped optical modulator according to claim 1, wherein the output optical waveguide is a Mach-Zehnder type optical waveguide.

4. A monitor photodetector-equipped optical modulator according to claim 1, wherein the monitor photodetector is provided near the substrate facet.

5. A monitor photodetector-equipped optical modulator according to claim 1, wherein the monitor photodetector is provided through a room.

6. A monitor photodetector-equipped optical modulator according to claim 1, further comprising a mirror which is fixed near the substrate facet, wherein, after at least one of the two radiant light beams is emitted from the substrate, an optical path is changed by the mirror and the radiant light beam is adapted to be incident on the monitor photodetector.

7. A monitor photodetector-equipped optical modulator according to claim 1, further comprising a capillary which is fixed near the substrate facet, wherein, after at least one of the two radiant light beams is emitted through the capillary, the radiant light beam is adapted to be incident on the monitor photodetector.

8. A monitor photodetector-equipped optical modulator according to claim 1, further comprising an optical power attenuation mechanism which is provided between the multiplexing point and the substrate facet on an output optical waveguide side of the substrate such that one of the two radiant light beams radiated from the multiplexing point of the multiplexing optical waveguide is attenuated while the radiant light beam propagates toward the substrate facet.

9. A monitor photodetector-equipped optical modulator according to claim 1, wherein the monitor photodetector comprises a photodiode.

10. A monitor photodetector-equipped optical modulator according to claim 1, wherein a facet to a substrate facet side of the capillary is substantially parallel to a facet to a side in which one of the two radiant light beams is emitted in the capillary.

11. A monitor photodetector-equipped optical modulator according to claim 10, wherein a region, where the facets are not parallel to each other, exists between the facet to the substrate facet side of the capillary and at least a part of the facet to the side in which one of the two radiant light beams is emitted in the capillary.

* * * * *